(12) United States Patent
Craig

(10) Patent No.: US 8,630,457 B2
(45) Date of Patent: Jan. 14, 2014

(54) PROBLEM STATES FOR POSE TRACKING PIPELINE

(75) Inventor: Robert Craig, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 210 days.

(21) Appl. No.: 13/327,098

(22) Filed: Dec. 15, 2011

(65) Prior Publication Data

US 2013/0156260 A1    Jun. 20, 2013

(51) Int. Cl.
*G06K 9/00* (2006.01)

(52) U.S. Cl.
USPC .......................................................... 382/103

(58) Field of Classification Search
USPC .................... 382/103, 154; 348/169; 345/419
See application file for complete search history.

(56) References Cited

U.S. PATENT DOCUMENTS

| | | | |
|---|---|---|---|
| 4,627,620 A | 12/1986 | Yang |
| 4,630,910 A | 12/1986 | Ross et al. |
| 4,645,458 A | 2/1987 | Williams |
| 4,695,953 A | 9/1987 | Blair et al. |
| 4,702,475 A | 10/1987 | Elstein et al. |
| 4,711,543 A | 12/1987 | Blair et al. |
| 4,751,642 A | 6/1988 | Silva et al. |
| 4,796,997 A | 1/1989 | Svetkoff et al. |
| 4,809,065 A | 2/1989 | Harris et al. |
| 4,817,950 A | 4/1989 | Goo |
| 4,843,568 A | 6/1989 | Krueger et al. |
| 4,893,183 A | 1/1990 | Nayar |
| 4,901,362 A | 2/1990 | Terzian |
| 4,925,189 A | 5/1990 | Braeunig |
| 5,101,444 A | 3/1992 | Wilson et al. |
| 5,148,154 A | 9/1992 | MacKay et al. |
| 5,184,295 A | 2/1993 | Mann |
| 5,229,754 A | 7/1993 | Aoki et al. |
| 5,229,756 A | 7/1993 | Kosugi et al. |
| 5,239,463 A | 8/1993 | Blair et al. |

(Continued)

FOREIGN PATENT DOCUMENTS

| | | |
|---|---|---|
| CN | 201254344 B | 6/2010 |
| EP | 0583061 A2 | 2/1994 |

(Continued)

OTHER PUBLICATIONS

Shotton, et al., "Real-Time Human Pose Recognition in Parts from Single Depth Images", Retrieved at <<http://research.microsoft.com/pubs/145347/BodyPartRecognition.pdf>>, IEEE Conference on Computer Vision and Pattern Recognition, 2011, pp. 1297-1304.

(Continued)

*Primary Examiner* — Shervin Nakhjavan
(74) *Attorney, Agent, or Firm* — Alleman Hall McCoy Russell & Tuttle LLP

(57) ABSTRACT

A human subject is tracked within a scene of an observed depth image supplied to a pose tracking pipeline. An indication of a problem state is received from the pose tracking pipeline, and an identification of the problem state is supplied to the pose tracking pipeline. A virtual skeleton is received from the pose tracking pipeline that includes a plurality of skeletal points defined in three-dimensions. The pose tracking pipeline selects a three-dimensional position of at least one of the plurality of skeletal points in accordance with the identification of the problem state supplied to the pose-tracking pipeline.

20 Claims, 9 Drawing Sheets

(56) References Cited

U.S. PATENT DOCUMENTS

| | | |
|---|---|---|
| 5,239,464 A | 8/1993 | Blair et al. |
| 5,288,078 A | 2/1994 | Capper et al. |
| 5,295,491 A | 3/1994 | Gevins |
| 5,320,538 A | 6/1994 | Baum |
| 5,347,306 A | 9/1994 | Nitta |
| 5,385,519 A | 1/1995 | Hsu et al. |
| 5,405,152 A | 4/1995 | Katanics et al. |
| 5,417,210 A | 5/1995 | Funda et al. |
| 5,423,554 A | 6/1995 | Davis |
| 5,454,043 A | 9/1995 | Freeman |
| 5,469,740 A | 11/1995 | French et al. |
| 5,495,576 A | 2/1996 | Ritchey |
| 5,516,105 A | 5/1996 | Eisenbrey et al. |
| 5,524,637 A | 6/1996 | Erickson et al. |
| 5,534,917 A | 7/1996 | MacDougall |
| 5,563,988 A | 10/1996 | Maes et al. |
| 5,577,981 A | 11/1996 | Jarvik |
| 5,580,249 A | 12/1996 | Jacobsen et al. |
| 5,594,469 A | 1/1997 | Freeman et al. |
| 5,597,309 A | 1/1997 | Riess |
| 5,616,078 A | 4/1997 | Oh |
| 5,617,312 A | 4/1997 | Iura et al. |
| 5,638,300 A | 6/1997 | Johnson |
| 5,641,288 A | 6/1997 | Zaenglein |
| 5,682,196 A | 10/1997 | Freeman |
| 5,682,229 A | 10/1997 | Wangler |
| 5,690,582 A | 11/1997 | Ulrich et al. |
| 5,703,367 A | 12/1997 | Hashimoto et al. |
| 5,704,837 A | 1/1998 | Iwasaki et al. |
| 5,715,834 A | 2/1998 | Bergamasco et al. |
| 5,875,108 A | 2/1999 | Hoffberg et al. |
| 5,877,803 A | 3/1999 | Wee et al. |
| 5,913,727 A | 6/1999 | Ahdoot |
| 5,933,125 A | 8/1999 | Fernie |
| 5,980,256 A | 11/1999 | Carmein |
| 5,989,157 A | 11/1999 | Walton |
| 5,995,649 A | 11/1999 | Marugame |
| 6,005,548 A | 12/1999 | Latypov et al. |
| 6,009,210 A | 12/1999 | Kang |
| 6,054,991 A | 4/2000 | Crane et al. |
| 6,066,075 A | 5/2000 | Poulton |
| 6,072,494 A | 6/2000 | Nguyen |
| 6,073,489 A | 6/2000 | French et al. |
| 6,077,201 A | 6/2000 | Cheng |
| 6,098,458 A | 8/2000 | French et al. |
| 6,100,896 A | 8/2000 | Strohecker et al. |
| 6,101,289 A | 8/2000 | Kellner |
| 6,128,003 A | 10/2000 | Smith et al. |
| 6,130,677 A | 10/2000 | Kunz |
| 6,141,463 A | 10/2000 | Covell et al. |
| 6,147,678 A | 11/2000 | Kumar et al. |
| 6,152,856 A | 11/2000 | Studor et al. |
| 6,159,100 A | 12/2000 | Smith |
| 6,173,066 B1 | 1/2001 | Peurach et al. |
| 6,181,343 B1 | 1/2001 | Lyons |
| 6,188,777 B1 | 2/2001 | Darrell et al. |
| 6,215,890 B1 | 4/2001 | Matsuo et al. |
| 6,215,898 B1 | 4/2001 | Woodfill et al. |
| 6,226,396 B1 | 5/2001 | Marugame |
| 6,229,913 B1 | 5/2001 | Nayar et al. |
| 6,256,033 B1 | 7/2001 | Nguyen |
| 6,256,400 B1 | 7/2001 | Takata et al. |
| 6,283,860 B1 | 9/2001 | Lyons et al. |
| 6,289,112 B1 | 9/2001 | Jain et al. |
| 6,299,308 B1 | 10/2001 | Voronka et al. |
| 6,308,565 B1 | 10/2001 | French et al. |
| 6,316,934 B1 | 11/2001 | Amorai-Moriya et al. |
| 6,363,160 B1 | 3/2002 | Bradski et al. |
| 6,384,819 B1 | 5/2002 | Hunter |
| 6,411,744 B1 | 6/2002 | Edwards |
| 6,430,997 B1 | 8/2002 | French et al. |
| 6,476,834 B1 | 11/2002 | Doval et al. |
| 6,496,598 B1 | 12/2002 | Harman |
| 6,503,195 B1 | 1/2003 | Keller et al. |
| 6,539,931 B2 | 4/2003 | Trajkovic et al. |
| 6,570,555 B1 | 5/2003 | Prevost et al. |
| 6,633,294 B1 | 10/2003 | Rosenthal et al. |
| 6,640,202 B1 | 10/2003 | Dietz et al. |
| 6,661,918 B1 | 12/2003 | Gordon et al. |
| 6,674,877 B1 | 1/2004 | Jojic et al. |
| 6,681,031 B2 | 1/2004 | Cohen et al. |
| 6,714,665 B1 | 3/2004 | Hanna et al. |
| 6,731,799 B1 | 5/2004 | Sun et al. |
| 6,738,066 B1 | 5/2004 | Nguyen |
| 6,765,726 B2 | 7/2004 | French et al. |
| 6,788,809 B1 | 9/2004 | Grzeszczuk et al. |
| 6,801,637 B2 | 10/2004 | Voronka et al. |
| 6,873,723 B1 | 3/2005 | Aucsmith et al. |
| 6,876,496 B2 | 4/2005 | French et al. |
| 6,937,742 B2 | 8/2005 | Roberts et al. |
| 6,950,534 B2 | 9/2005 | Cohen et al. |
| 7,003,134 B1 | 2/2006 | Covell et al. |
| 7,036,094 B1 | 4/2006 | Cohen et al. |
| 7,038,855 B2 | 5/2006 | French et al. |
| 7,039,676 B1 | 5/2006 | Day et al. |
| 7,042,440 B2 | 5/2006 | Pryor et al. |
| 7,050,606 B2 | 5/2006 | Paul et al. |
| 7,058,204 B2 | 6/2006 | Hildreth et al. |
| 7,060,957 B2 | 6/2006 | Lange et al. |
| 7,113,918 B1 | 9/2006 | Ahmad et al. |
| 7,121,946 B2 | 10/2006 | Paul et al. |
| 7,170,492 B2 | 1/2007 | Bell |
| 7,184,048 B2 | 2/2007 | Hunter |
| 7,202,898 B1 | 4/2007 | Braun et al. |
| 7,222,078 B2 | 5/2007 | Abelow |
| 7,227,526 B2 | 6/2007 | Hildreth et al. |
| 7,259,747 B2 | 8/2007 | Bell |
| 7,308,112 B2 | 12/2007 | Fujimura et al. |
| 7,317,836 B2 | 1/2008 | Fujimura et al. |
| 7,348,963 B2 | 3/2008 | Bell |
| 7,359,121 B2 | 4/2008 | French et al. |
| 7,367,887 B2 | 5/2008 | Watabe et al. |
| 7,379,563 B2 | 5/2008 | Shamaie |
| 7,379,566 B2 | 5/2008 | Hildreth |
| 7,389,591 B2 | 6/2008 | Jaiswal et al. |
| 7,412,077 B2 | 8/2008 | Li et al. |
| 7,421,093 B2 | 9/2008 | Hildreth et al. |
| 7,430,312 B2 | 9/2008 | Gu |
| 7,436,496 B2 | 10/2008 | Kawahito |
| 7,450,736 B2 | 11/2008 | Yang et al. |
| 7,452,275 B2 | 11/2008 | Kuraishi |
| 7,460,690 B2 | 12/2008 | Cohen et al. |
| 7,489,812 B2 | 2/2009 | Fox et al. |
| 7,536,032 B2 | 5/2009 | Bell |
| 7,555,142 B2 | 6/2009 | Hildreth et al. |
| 7,560,701 B2 | 7/2009 | Oggier et al. |
| 7,570,805 B2 | 8/2009 | Gu |
| 7,574,020 B2 | 8/2009 | Shamaie |
| 7,576,727 B2 | 8/2009 | Bell |
| 7,590,262 B2 | 9/2009 | Fujimura et al. |
| 7,593,552 B2 | 9/2009 | Higaki et al. |
| 7,598,942 B2 | 10/2009 | Underkoffler et al. |
| 7,607,509 B2 | 10/2009 | Schmiz et al. |
| 7,620,202 B2 | 11/2009 | Fujimura et al. |
| 7,668,340 B2 | 2/2010 | Cohen et al. |
| 7,680,298 B2 | 3/2010 | Roberts et al. |
| 7,683,954 B2 | 3/2010 | Ichikawa et al. |
| 7,684,592 B2 | 3/2010 | Paul et al. |
| 7,701,439 B2 | 4/2010 | Hillis et al. |
| 7,702,130 B2 | 4/2010 | Im et al. |
| 7,704,135 B2 | 4/2010 | Harrison, Jr. |
| 7,710,391 B2 | 5/2010 | Bell et al. |
| 7,729,530 B2 | 6/2010 | Antonov et al. |
| 7,746,345 B2 | 6/2010 | Hunter |
| 7,760,182 B2 | 7/2010 | Ahmad et al. |
| 7,809,167 B2 | 10/2010 | Bell |
| 7,834,846 B2 | 11/2010 | Bell |
| 7,852,262 B2 | 12/2010 | Namineni et al. |
| RE42,256 E | 3/2011 | Edwards |
| 7,898,522 B2 | 3/2011 | Hildreth et al. |
| 8,035,612 B2 | 10/2011 | Bell et al. |
| 8,035,614 B2 | 10/2011 | Bell et al. |
| 8,035,624 B2 | 10/2011 | Bell et al. |
| 8,072,470 B2 | 12/2011 | Marks |

(56) References Cited

U.S. PATENT DOCUMENTS

| | | | |
|---|---|---|---|
| 8,295,546 B2* | 10/2012 | Craig et al. | 382/103 |
| 2008/0026838 A1 | 1/2008 | Dunstan et al. | |
| 2008/0123968 A1 | 5/2008 | Nevatia et al. | |
| 2008/0152191 A1 | 6/2008 | Fujimura et al. | |
| 2008/0247609 A1 | 10/2008 | Feris et al. | |
| 2009/0252423 A1* | 10/2009 | Zhu et al. | 382/209 |
| 2010/0303289 A1* | 12/2010 | Polzin et al. | 382/103 |
| 2010/0303302 A1 | 12/2010 | Kipman et al. | |

FOREIGN PATENT DOCUMENTS

| | | | |
|---|---|---|---|
| JP | 08044490 A1 | 2/1996 | |
| WO | 93/10708 A1 | 6/1993 | |
| WO | 97/17598 A1 | 5/1997 | |
| WO | 99/44698 A1 | 9/1999 | |

OTHER PUBLICATIONS

Wu, et al., "Detection and Tracking of Multiple, Partially Occluded Humans by Bayesian Combination of Edgelet based Part Detectors", Retrieved at <<http://iris.usc.edu/outlines/papers/2007/wu-nevatia-ijcv07.pdf>>, International Journal of Computer Vision, vol. 75, No. 2, Dec. 13, 2006, pp. 247-266.

Lee, et al., "Body Part Detection for Human Pose Estimation and Tracking", Retrieved at <<http://iris.usc.edu/outlines/papers/2007/lee-nevatia-wmvc-07.pdf>>, IEEE Workshop on Motion and Video Computing (WMVC), 2007, pp. 8.

Kanade et al., "A Stereo Machine for Video-rate Dense Depth Mapping and Its New Applications", IEEE Computer Society Conference on Computer Vision and Pattern Recognition, 1996, pp. 196-202, The Robotics Institute, Carnegie Mellon University, Pittsburgh, PA.

Miyagawa et al., "CCD-Based Range Finding Sensor", Oct. 1997, pp. 1648-1652, vol. 44 No. 10, IEEE Transactions on Electron Devices.

Rosenhahn et al., "Automatic Human Model Generation", 2005, pp. 41-48, University of Auckland (CITR), New Zealand.

Aggarwal et al., "Human Motion Analysis: A Review", IEEE Non-rigid and Articulated Motion Workshop, 1997, University of Texas at Austin, Austin, TX.

Shag et al., "An Open System Architecture for a Multimedia and Multimodal User Interface", Aug. 24, 1998, Japanese Society for Rehabilitation of Persons with Disabilities (JSRPD), Japan.

Kohler, "Special Topics of Gesture Recognition Applied in Intelligent Home Environments", In Proceedings of the Gesture Workshop, 1998, pp. 285-296, Germany.

Kohler, "Vision Based Remote Control in Intelligent Home Environments", University of Erlangen-Nuremberg/Germany, 1996, pp. 147-154, Germany.

Kohler, "Technical Details and Ergonomical Aspects of Gesture Recognition applied in Intelligent Home Environments", 1997, Germany.

Hasegawa et al., "Human-Scale Haptic Interaction with a Reactive Virtual Human in a Real-Time Physics Simulator", Jul. 2006, vol. 4, No. 3, Article 6C, ACM Computers in Entertainment, New York, NY.

Qian et al., "A Gesture-Driven Multimodal Interactive Dance System", Jun. 2004, pp. 1579-1582, IEEE International Conference on Multimedia and Expo (ICME), Taipei, Taiwan.

Zhao, "Dressed Human Modeling, Detection, and Parts Localization", 2001, The Robotics Institute, Carnegie Mellon University, Pittsburgh, PA.

He, "Generation of Human Body Models", Apr. 2005, University of Auckland, New Zealand.

Isard et al., "Condensation—Conditional Density Propagation for Visual Tracking", 1998, pp. 5-28, International Journal of Computer Vision 29(1), Netherlands.

Livingston, "Vision-based Tracking with Dynamic Structured Light for Video See-through Augmented Reality", 1998, University of North Carolina at Chapel Hill, North Carolina, USA.

Wren et al., "Pfinder: Real-Time Tracking of the Human Body", MIT Media Laboratory Perceptual Computing Section Technical Report No. 353, Jul. 1997, vol. 19, No. 7, pp. 780-785, IEEE Transactions on Pattern Analysis and Machine Intelligence, Caimbridge, MA.

Breen et al., "Interactive Occlusion and Collusion of Real and Virtual Objects in Augmented Reality", Technical Report ECRC-95-02, 1995, European Computer-Industry Research Center GmbH, Munich, Germany.

Freeman et al., "Television Control by Hand Gestures", Dec. 1994, Mitsubishi Electric Research Laboratories, TR94-24, Caimbridge, MA.

Hongo et al., "Focus of Attention for Face and Hand Gesture Recognition Using Multiple Cameras", Mar. 2000, pp. 156-161, 4th IEEE International Conference on Automatic Face and Gesture Recognition, Grenoble, France.

Pavlovic et al., "Visual Interpretation of Hand Gestures for Human-Computer Interaction: A Review", Jul. 1997, pp. 677-695, vol. 19, No. 7, IEEE Transactions on Pattern Analysis and Machine Intelligence.

Azarbayejani et al., "Visually Controlled Graphics", Jun. 1993, vol. 15, No. 6, IEEE Transactions on Pattern Analysis and Machine Intelligence.

Granieri et al., "Simulating Humans in VR", The British Computer Society, Oct. 1994, Academic Press.

Brogan et al., "Dynamically Simulated Characters in Virtual Environments", Sep./Oct. 1998, pp. 2-13, vol. 18, Issue 5, IEEE Computer Graphics and Applications.

Fisher et al., "Virtual Environment Display System", ACM Workshop on Interactive 3D Graphics, Oct. 1986, Chapel Hill, NC.

"Virtual High Anxiety", Tech Update, Aug. 1995, pp. 22.

Sheridan et al., "Virtual Reality Check", Technology Review, Oct. 1993, pp. 22-28, vol. 96, No. 7.

Stevens, "Flights into Virtual Reality Treating Real World Disorders", The Washington Post, Mar. 27, 1995, Science Psychology, 2 pages.

"Simulation and Training", 1994, Division Incorporated.

* cited by examiner

PROBLEM STATES FOR POSE TRACKING PIPELINE

BACKGROUND

Optical tracking of a human subject may be used to control electronic devices such as computers and gaming consoles. For example, a human subject may provide a control input to an electronic device by moving his or her body within a scene observed by an optical sensor. For at least some electronic devices, an image of the human subject captured by the optical sensor may be analyzed to create a model of the human subject, which may be translated into a control input for the electronic device.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A human subject is tracked within a scene of an observed depth image supplied to a pose tracking pipeline. An indication of a problem state is received from the pose tracking pipeline, and an identification of the problem state is supplied to the pose tracking pipeline. A virtual skeleton is received from the pose tracking pipeline that includes a plurality of skeletal points defined in three-dimensions. The pose tracking pipeline selects a three-dimensional position of at least one of the plurality of skeletal points in accordance with the identification of the problem state supplied to the pose-tracking pipeline.

DETAILED DESCRIPTION

The present disclosure is directed to recognition, analysis, and tracking of a human subject by supplying an identification of zero, one, or more problem states to a pose tracking pipeline. The pose tracking pipeline is supplied an observed depth image of the human subject within a scene captured by a depth camera. The observed depth image is processed by the pose tracking pipeline to model the human subject with a virtual skeleton that includes multiple skeletal points defined in three-dimensions. The pose tracking pipeline selects a three-dimensional position of one or more of the skeletal points in accordance with the identification of zero, one, or more problem states.

A problem state may refer to a pre-defined state of a human subject within an observed scene. The existence of one or more of these problem states within an observed scene may decrease the accuracy or increase the uncertainty of pose recognition. However, the accuracy and certainty of the pose recognition may be improved by identifying whether zero, one, or more problem states exists within a scene, and by providing the pipeline with information identifying the existing problem state so that the pipeline is able to tune processing for that particular problem state.

Example problem states may include: an occluded state in which a portion of the human subject is occluded by another object within the observed scene, a cropped state in which a portion of the human subject resides outside of the observed scene, a proximate state in which a portion of the human subject resides at the same or similar depth within the scene as another object, a crossed state in which a portion of the human subject has crossed a virtual boundary into a region where that portion of the human subject does not usually reside, and a velocity limited state in which a portion of the human subject moves at a rate that exceeds an upper or lower velocity threshold. However, other suitable problem states may be identified.

Figure 1A:
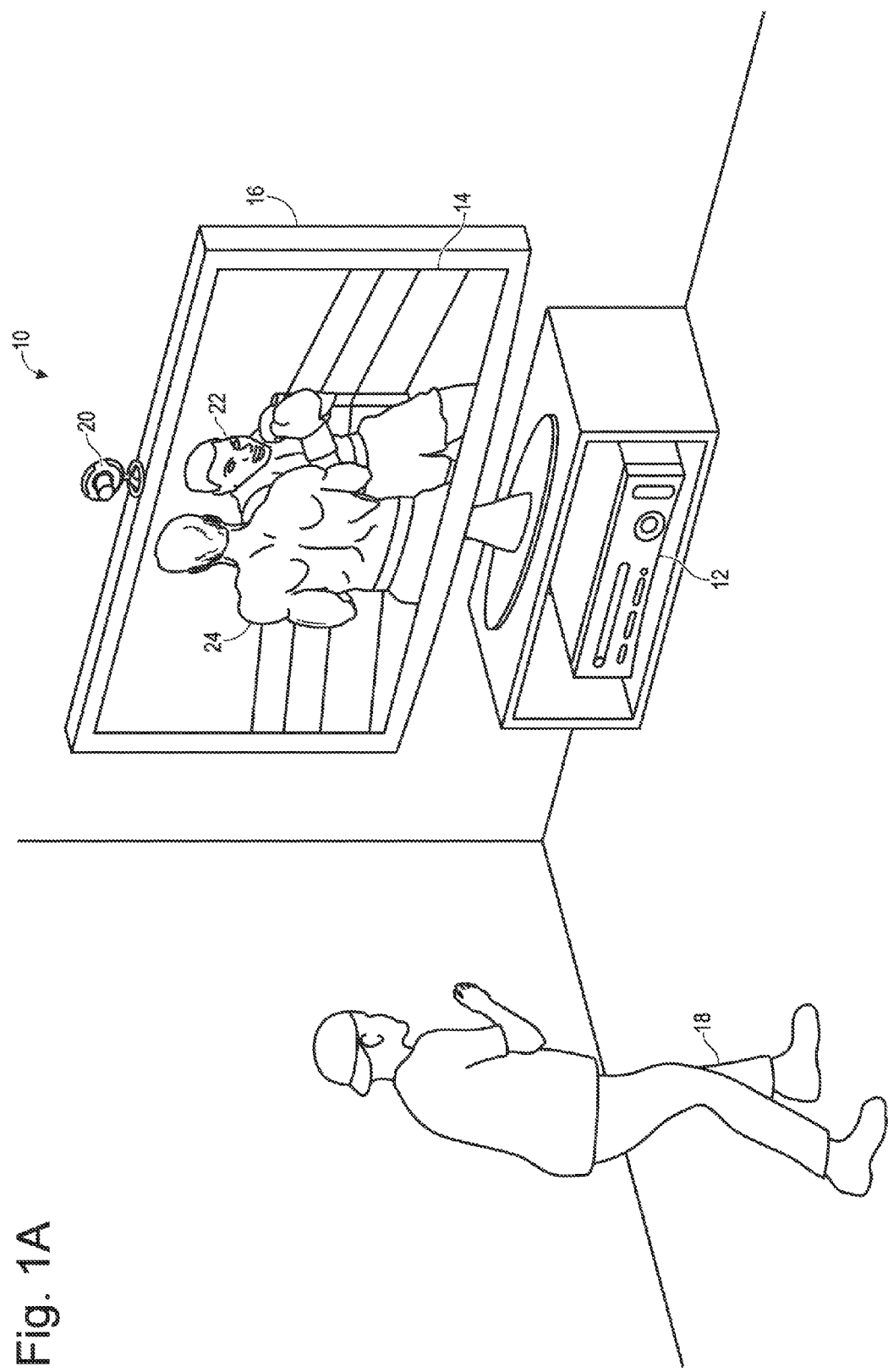
FIG. 1A shows an embodiment of an exemplary recognition, analysis, and tracking system tracking a human subject.

FIG. 1A shows a nonlimiting example of a tracking system 10. In particular, FIG. 1A shows a computer gaming system 12 that may be used to play a variety of different games, play one or more different media types, and/or control or manipulate non-game applications. FIG. 1A also shows a display 14 in the form of a high-definition television, or HDTV 16, which may be used to present game visuals to game players, such as human subject 18. Furthermore, FIG. 1A shows a capture device in the form of a depth camera 20, which may be used to visually monitor one or more game players, such as human subject 18. The example shown in FIG. 1A is nonlimiting. As described below with reference to FIG. 2, a variety of different types of tracking systems may be used without departing from the scope of this disclosure.

A tracking system may be used to recognize, analyze, and/or track one or more targets, such as human subject 18. FIG. 1A shows a scenario in which human subject 18 is tracked using depth camera 20 so that the movements of human subject 18 may be interpreted by gaming system 12 as controls that can be used to affect the game being executed by gaming system 12. In other words, human subject 18 may use his or her movements to control the game. The movements of human subject 18 may be interpreted as virtually any type of game control.

Figure 1B:
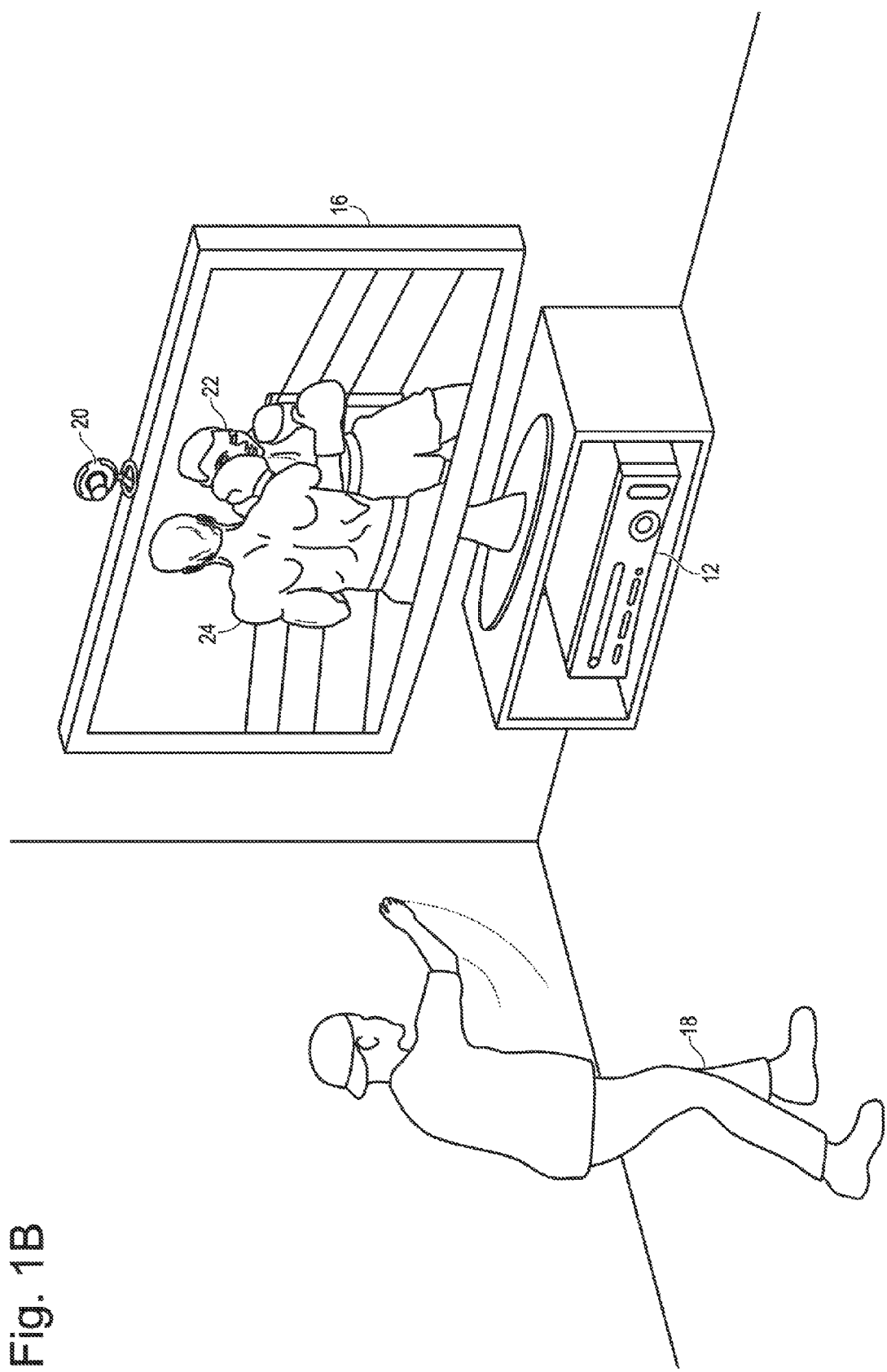
FIG. 1B shows the human subject of FIG. 1A tracked by the tracking system.

The example scenario illustrated in FIG. 1A shows human subject 18 playing a boxing game that is being executed by gaming system 12. The gaming system uses HDTV 16 to visually present a boxing opponent 22 to human subject 18. Furthermore, the gaming system uses HDTV 16 to visually present a player avatar 24 that human subject 18 controls with his or her movements. As shown in FIG. 1B, human subject 18 can throw a punch in physical/world space as an instruction for player avatar 24 to throw a punch in game/virtual space. Gaming system 12 and depth camera 20 can be used to recognize and analyze the punch of human subject 18 in physical space so that the punch can be interpreted as a game control that causes player avatar 24 to throw a punch in game space. For example, FIG. 1B shows HDTV 16 visually presenting player avatar 24 throwing a punch that strikes boxing opponent 22 responsive to human subject 18 throwing a punch in physical space.

Other movements by human subject 18 may be interpreted as other controls, such as controls to bob, weave, shuffle, block, jab, or throw a variety of different punches. Furthermore, some movements may be interpreted into controls that serve purposes other than controlling player avatar 24. For example, the human subject may use movements to end, pause, or save a game, select a game level, view high scores, communicate with a friend or other player, etc.

In some embodiments, a target to be tracked may include a human subject and an object. In such embodiments, for example, a human subject may be holding an object, such that the motions of the human subject and the object are utilized to adjust and/or control parameters of an electronic game. For example, the motion of a human subject holding a racket may be tracked and utilized for controlling an on-screen racket in an electronic sports game. In another example, the motion of a human subject holding an object may be tracked and utilized for controlling an on-screen weapon in an electronic combat game.

Tracking systems may be used to interpret movements of a target (e.g., a human subject) as operating system and/or application controls that are outside the realm of gaming. Virtually any controllable aspect of an operating system and/or application, such as the boxing game shown in FIGS. 1A and 1B, may be controlled by movements of a target, such as human subject 18. The illustrated boxing scenario is provided as an example, but is not meant to be limiting in any way. To the contrary, the illustrated scenario is intended to demonstrate a general concept, which may be applied to a variety of different applications without departing from the scope of this disclosure.

Figure 2:
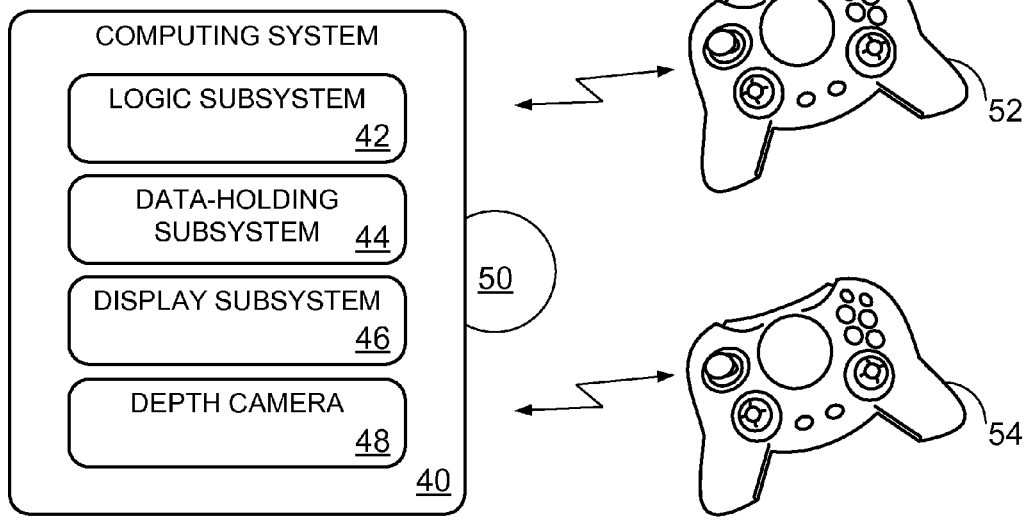
FIG. 2 schematically shows a computing system in accordance with an embodiment of the present disclosure.

The methods and processes described herein may be tied to a variety of different types of computing systems. FIGS. 1A and 1B show a nonlimiting example in the form of gaming system 12, HDTV 16, and depth camera 20. As another, more general, example, FIG. 2 schematically shows a computing system 40 that may perform one or more of the recognition, tracking, and analysis methods and processes described herein. Computing system 40 may take a variety of different forms, including, but not limited to, gaming consoles, personal computing systems, public computing systems, human-interactive robots, military tracking and/or targeting systems, and character acquisition systems offering green-screen or motion-capture functionality, among others.

Computing system 40 may include a logic subsystem 42, a data-holding subsystem 44, a display subsystem 46, and/or a capture device 48. The computing system may optionally include components not shown in FIG. 2, and/or some components shown in FIG. 2 may be peripheral components that are not integrated into the computing system.

Logic subsystem 42 may include one or more physical devices configured to execute one or more instructions. For example, the logic subsystem may be configured to execute one or more instructions that are part of one or more programs, routines, objects, components, data structures, or other logical constructs. Such instructions may be implemented to perform a task, implement a data type, transform the state of one or more devices, or otherwise arrive at a desired result. The logic subsystem may include one or more processors that are configured to execute software instructions. Additionally or alternatively, the logic subsystem may include one or more hardware or firmware logic machines configured to execute hardware or firmware instructions. The logic subsystem may optionally include individual components that are distributed throughout two or more devices, which may be remotely located in some embodiments.

Data-holding subsystem 44 may include one or more physical devices configured to hold data and/or instructions executable by the logic subsystem to implement the herein described methods and processes. When such methods and processes are implemented, the state of data-holding subsystem 44 may be transformed (e.g., to hold different data). Data-holding subsystem 44 may include removable media and/or built-in devices. Data-holding subsystem 44 may include optical memory devices, semiconductor memory devices (e.g., RAM, EEPROM, flash, etc.), and/or magnetic memory devices, among others. Data-holding subsystem 44 may include devices with one or more of the following characteristics: volatile, nonvolatile, dynamic, static, read/write, read-only, random access, sequential access, location addressable, file addressable, and content addressable. In some embodiments, logic subsystem 42 and data-holding subsystem 44 may be integrated into one or more common devices, such as an application specific integrated circuit or a system on a chip.

FIG. 2 also shows an aspect of the data-holding subsystem in the form of computer-readable removable media 50, which may be used to store and/or transfer data and/or instructions executable to implement the herein described methods and processes.

Display subsystem 46 may be used to present a visual representation of data held by data-holding subsystem 44. As the herein described methods and processes change the data held by the data-holding subsystem, and thus transform the state of the data-holding subsystem, the state of display subsystem 46 may likewise be transformed to visually represent changes in the underlying data. As a nonlimiting example, the recognition, tracking, and analysis of human subjects described herein may be reflected via display subsystem 46 in the form of a game character that changes poses in game space responsive to the movements of a game player in physical space. Display subsystem 46 may include one or more display devices utilizing virtually any type of technology. Such display devices may be combined with logic subsystem 42 and/or data-holding subsystem 44 in a shared enclosure, or such display devices may be peripheral display devices, as shown in FIGS. 1A and 1B.

Computing system 40 further includes a capture device 48 configured to obtain depth images of one or more targets. Capture device 48 may be configured to capture video with depth information via any suitable technique (e.g., time-of-flight, structured light, stereo image, etc.). The captured video may take the form of a time-series of multiple observed depth images. As such, capture device 48 may include a depth camera, a video camera, stereo cameras, and/or other suitable capture devices.

For example, in time-of-flight analysis, the capture device 48 may emit infrared light to a target and may then use sensors to detect the backscattered light from the surface of the target. In some cases, pulsed infrared light may be used, wherein the time between an outgoing light pulse and a corresponding incoming light pulse may be measured and used to determine a physical distance from the capture device to a particular location on the target. In some cases, the phase of the outgoing light wave may be compared to the phase of the incoming light wave to determine a phase shift, and the phase shift may be used to determine a physical distance from the capture device to a particular location on the target.

In another example, time-of-flight analysis may be used to indirectly determine a physical distance from the capture device to a particular location on the target by analyzing the intensity of the reflected beam of light over time, via a technique such as shuttered light pulse imaging.

In another example, structured light analysis may be utilized by capture device 48 to capture depth information. In such an analysis, patterned light (i.e., light displayed as a known pattern such as grid pattern, a stripe pattern, a constellation of dots, etc.) may be projected onto the target. Upon striking the surface of the target, the pattern may become deformed, and this deformation of the pattern may be studied to determine a physical distance from the capture device to a particular location on the target.

In another example, the capture device may include two or more physically separated cameras that view a target from different angles to obtain visual stereo data. In such cases, the visual stereo data may be resolved to generate a depth image.

In other embodiments, capture device 48 may utilize other technologies to measure and/or calculate depth values. Additionally, capture device 48 may organize the calculated depth information into "Z layers," i.e., layers perpendicular or normal to a Z axis extending from the depth camera along its line of sight to a target.

In some embodiments, two or more different cameras may be incorporated into an integrated capture device. For example, a depth camera and a video camera (e.g., RGB video camera) may be incorporated into a common capture device. In some embodiments, two or more separate capture devices may be cooperatively used. For example, a depth camera and a separate video camera may be used. When a video camera is used, the video camera may be used to provide target tracking data, confirmation data for error correction of target tracking, image capture, face recognition, high-precision tracking of fingers (or other small features), light sensing, and/or other functions.

It is to be understood that at least some target analysis and tracking operations may be executed by a logic machine of one or more capture devices. A capture device may include one or more onboard processing units configured to perform one or more target analysis and/or tracking functions. A capture device may include firmware to facilitate updating such onboard processing logic.

Computing system 40 may optionally include one or more input devices, such as controller 52 and controller 54. Input devices may be used to control operation of the computing system. In the context of a game, input devices, such as controller 52 and/or controller 54 can be used to control aspects of a game not controlled via the target recognition, tracking, and analysis methods and procedures described herein. In some embodiments, input devices such as controller 52 and/or controller 54 may include one or more of accelerometers, gyroscopes, infrared target/sensor systems, etc., which may be used to measure movement of the controllers in physical space. In some embodiments, the computing system may optionally include and/or utilize input gloves, keyboards, mice, track pads, trackballs, touch screens, buttons, switches, dials, and/or other input devices. As will be appreciated, recognition, tracking, and analysis of human subjects may be used to control or augment aspects of a game, or other application, conventionally controlled by an input device, such as a game controller. In some embodiments, the human subject tracking described herein can be used as a complete replacement to other forms of user input, while in other embodiments such human subject tracking can be used to complement one or more other forms of user input.

Computing system 40 may be configured to perform the human subject tracking methods described herein. However, it should be understood that computing system 40 is provided as a nonlimiting example of a device that may perform such human subject tracking. Other devices are within the scope of this disclosure.

Computing system 40, or another suitable device, may be configured to represent each human subject with a model. As described in more detail below, information derived from such a model can be compared to information obtained from a capture device, such as a depth camera, so that the fundamental proportions or shape of the model, as well as its current pose, can be adjusted to more accurately represent the modeled human subject. The model may be represented by one or more polygonal meshes, by a set of mathematical primitives, and/or via other suitable machine representations of the modeled target.

Figure 3:
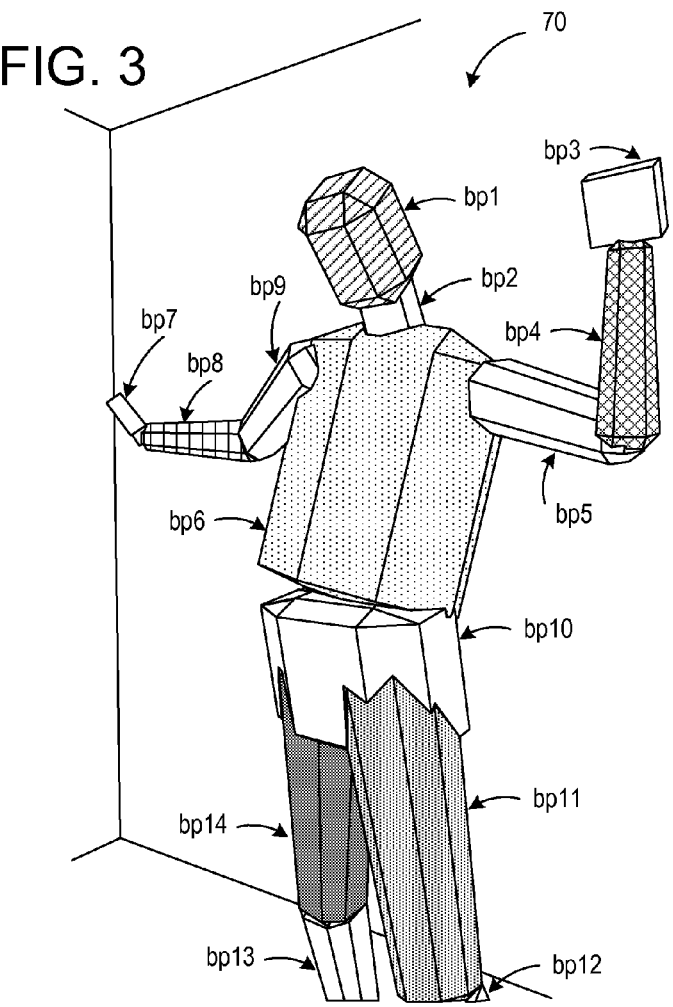
FIG. 3 shows an exemplary body model used to represent a human subject.

FIG. 3 shows a nonlimiting visual representation of an example body model 70. Body model 70 is a machine representation of a modeled target (e.g., human subject 18 from FIGS. 1A and 1B). The body model may include one or more data structures that include a set of variables that collectively define the modeled target in the language of a game or other application/operating system.

A model of a human subject can be variously configured without departing from the scope of this disclosure. In some examples, a model may include one or more data structures that represent a target as a three-dimensional model comprising rigid and/or deformable shapes, or body parts. Each body part may be characterized as a mathematical primitive, examples of which include, but are not limited to, spheres, anisotropically-scaled spheres, cylinders, anisotropic cylinders, smooth cylinders, boxes, beveled boxes, prisms, and the like.

For example, body model 70 of FIG. 3 includes body parts bp1 through bp14, each of which represents a different portion of a modeled human subject. Each body part is a three-dimensional shape. For example, bp3 is a rectangular prism that represents the left hand of a modeled human subject, and bp5 is an octagonal prism that represents the left upper-arm of the modeled human subject. Body model 70 is exemplary in that a body model may contain any number of body parts, each of which may be any machine-understandable representation of the corresponding part of the modeled target.

A model including two or more body parts may also include one or more joints. Each joint may allow one or more body parts to move relative to one or more other body parts. For example, a model representing a human subject may include a plurality of rigid and/or deformable body parts. Some of these body parts may represent a corresponding anatomical body part of the human subject. Further, each body part of the model may comprise one or more structural members (i.e., "bones" or skeletal parts), with joints located at the intersection of adjacent bones. It is to be understood that some bones may correspond to anatomical bones in a human subject and/or some bones may not have corresponding anatomical bones in the human subject.

Figure 4:
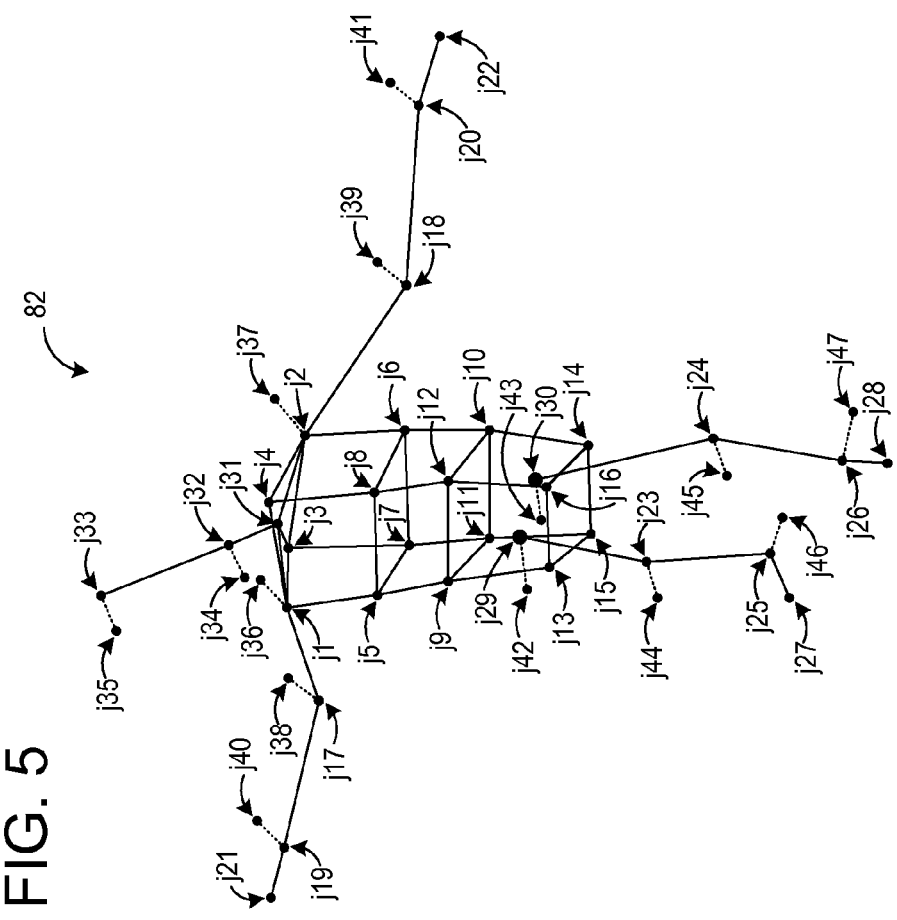
FIG. 4 shows a substantially frontal view of an exemplary skeletal model used to represent a human subject.
Figure 5:
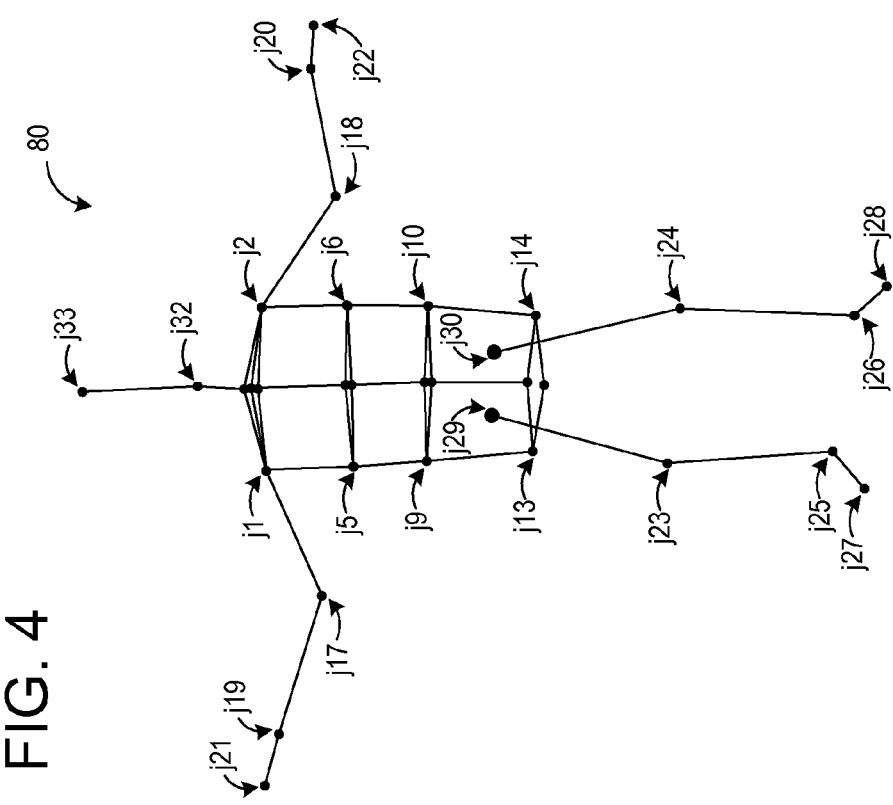
FIG. 5 shows a skewed view of an exemplary skeletal model used to represent a human subject.

The bones and joints may collectively make up a skeletal model (e.g., a virtual skeleton), which may be a constituent element of the body model. In some embodiments, a skeletal model may be used instead of another type of model, such as body model 70 of FIG. 3. The skeletal model may include one or more skeletal members for each body part and/or a joint between adjacent skeletal members. In other words, a virtual skeleton that includes a plurality of points defined in three-dimensional space may serve as this type of skeletal model. Exemplary skeletal model 80 and exemplary skeletal model 82 are shown in FIGS. 4 and 5, respectively. FIG. 4 shows a skeletal model 80 as viewed from the front, with joints j1 through j33. FIG. 5 shows a skeletal model 82 as viewed from a skewed view, also with joints j1 through j33.

Skeletal model 82 further includes roll joints j34 through j47, where each roll joint may be utilized to track axial roll angles. For example, an axial roll angle may be used to define a rotational orientation of a limb relative to its parent limb and/or the torso. For example, if a skeletal model is illustrating an axial rotation of an arm, roll joint j40 may be used to indicate the direction the associated wrist is pointing (e.g., palm facing up). By examining an orientation of a limb relative to its parent limb and/or the torso, an axial roll angle may be determined. For example, if examining a lower leg, the orientation of the lower leg relative to the associated upper leg and hips may be examined in order to determine an axial roll angle.

A skeletal model may include more or fewer joints without departing from the spirit of this disclosure.

As described above, some models may include a skeleton and/or other body parts that serve as a machine representation of a modeled target. In some embodiments, a model may alternatively or additionally include a wireframe mesh, which may include hierarchies of rigid polygonal meshes, one or more deformable meshes, or any combination of the two.

The above described body part models and skeletal models are nonlimiting example types of models that may be used as machine representations of a modeled human subject. Other models are also within the scope of this disclosure. For example, some models may include polygonal meshes, patches, non-uniform rational B-splines, subdivision surfaces, or other high-order surfaces. A model may also include surface textures and/or other information to more accurately represent clothing, hair, and/or other aspects of a modeled target. A model may optionally include information pertaining to a current pose, one or more past poses, and/or model physics. It is to be understood that a variety of different models that can be posed are compatible with the herein described target recognition, analysis, and tracking.

As mentioned above, a model serves as a representation of a target, such as human subject 18 in FIGS. 1A and 1B. As the human subject moves in physical space, information from a capture device, such as depth camera 20 in FIGS. 1A and 1B, can be used to adjust a pose and/or the fundamental size/shape of the model so that the model more accurately represents the human subject.

Figure 6:
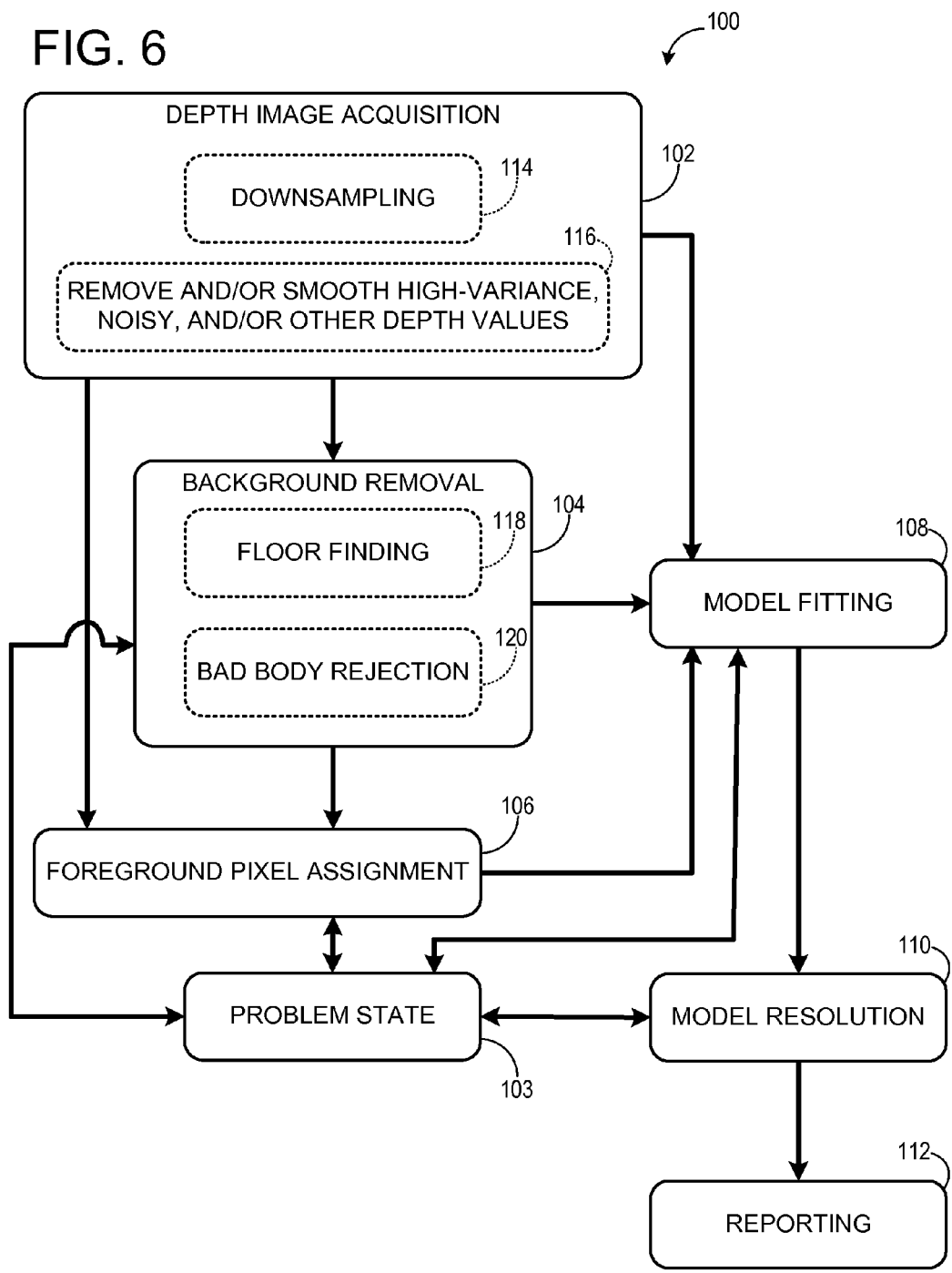
FIG. 6 shows a pose tracking pipeline for tracking a human subject.

FIG. 6 shows a flow diagram of an example pose tracking pipeline 100 for tracking one or more human subjects. Pose tracking pipeline 100 may be executed by a computing system (e.g., gaming system 12 shown in FIG. 1A and/or computing system 40 shown in FIG. 2) to track one or more human subjects interacting with an electronic game. As introduced above, tracking of the human subjects allows physical movements of those human subjects to act as real-time user controls that adjust and/or control parameters of an electronic game. It is to be understood that gaming is provided as a nonlimiting example, and the disclosed pipeline may be used to track human and/or nonhuman targets for a variety of other purposes.

The disclosed pipeline can be used to accurately and efficiently track one or more human subjects that are present in the field of view of a depth camera. The pipeline can model and track one or more human subjects in real time, thus providing a responsive, immersive, and realistic experience for a human subject being tracked.

In some embodiments, pose tracking pipeline 100 includes six conceptual processes: depth image acquisition 102, background removal process 104, foreground pixel assignment process 106, model fitting process 108, model resolution process 110, and reporting 112. Information identifying an existing problem state (e.g., problem state 103) may be supplied to one or more of these processes where the information may be used by these processes to output a virtual skeleton representing the human subject.

Depth image acquisition 102 may include receiving an observed depth image of the human subject from a source. In some embodiments, the source may be a depth camera configured to obtain depth information about the human subject via time-of-flight analysis, structured light analysis, stereo vision analysis, or other suitable technique. The observed depth image may include a plurality of observed pixels, where each observed pixel has an observed depth value. The observed depth value includes depth information of the human subject as viewed from the source.

The depth image may optionally be represented as a pixel matrix that includes, for each pixel address, a depth value indicating a world space depth from the plane of the depth camera, or another suitable reference plane, to a surface at that pixel address.

Figure 7:
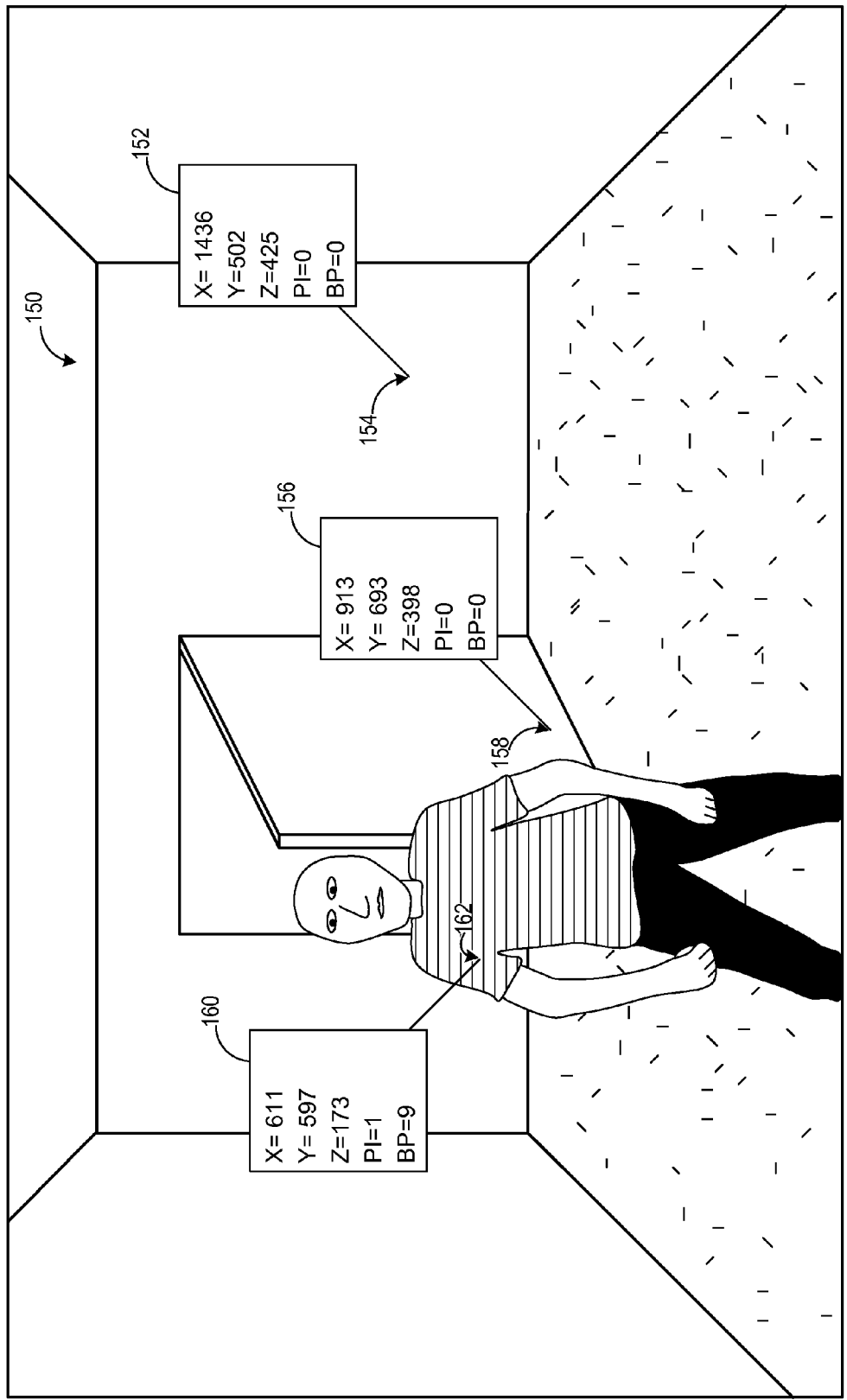
FIG. 7 shows a scene as viewed by a depth camera with schematic data structures showing data used to track a human subject.

FIG. 7 schematically shows a scene 150 captured by a depth camera. The depth camera determines a Z-value of a surface at each pixel address. As an example, FIG. 7 schematically shows a data structure 152 used to represent pixel 154 at pixel address [1436, 502]. Data structure 152 may be an element of a pixel matrix, for example. Data structure 152 includes a Z-value of 425 for pixel 154, thus indicating that the surface at that pixel address, in this case a wall, is 425 units deep in world space. As another example, a data structure 156 is used to represent pixel 158 at pixel address [913, 693]. Data structure 156 includes a Z-value of 398 for pixel 158, thus indicating that the surface at that pixel address, in this case a door, is 398 units deep in world space. As another example, a data structure 160 is used to represent pixel 162 at pixel address [611, 597]. Data structure 160 includes a Z-value of 173 for pixel 162, thus indicating that the surface at that pixel address, in this case a human subject, is 173 units deep in world space. While three pixels are provided as examples above, it is to be understood that some or all pixels captured by a capture device, or a downsampled set thereof, may be represented in this manner.

As shown at 114 of FIG. 6, depth image acquisition 102 may optionally include downsampling the observed depth image to a lower processing resolution. Downsampling to a lower processing resolution may allow the observed depth image to be more easily utilized and/or more quickly processed with less computing overhead.

As shown at 116 of FIG. 6, depth image acquisition 102 may optionally include removing and/or smoothing one or more high-variance and/or noisy depth values from the observed depth image. Such high-variance and/or noisy depth values in the observed depth image may result from a number of different sources, such as random and/or systematic errors occurring during the image capturing process, defects and/or aberrations resulting from the capture device, etc. Since such high-variance and/or noisy depth values may be artifacts of the image capturing process, including these values in any future analysis of the image may skew results and/or slow calculations. Thus, removal of such values may provide better data integrity and/or speed for future calculations.

Background removal process 104 may include distinguishing targets such as human subjects that are to be tracked from non-target background elements in the observed depth image. As used herein, the term "background" is used to describe anything in the scene that is not part of the target(s) to be tracked. The background may include elements that are in front of (i.e., closer to the depth camera) than the target(s) to be tracked. Distinguishing foreground elements that are to be tracked from background elements that may be ignored can increase tracking efficiency and/or simplify downstream processing.

Background removal process 104 may include assigning each data point (e.g., pixel) of the processed depth image a player index that identifies that data point as belonging to a particular human subject or to a non-target background element. When such an approach is used, pixels or other data points assigned a background index can be removed from consideration in one or more subsequent phases of pose tracking pipeline 100.

As an example, pixels corresponding to a first human subject can be assigned a player index equal to one, pixels corresponding to a second human subject can be assigned a player index equal to two, and pixels that do not correspond to a human subject can be assigned a player index equal to zero. Such player indices can be saved or otherwise stored in any suitable manner. In some embodiments, a pixel matrix may include, at each pixel address, a player index indicating if a surface at that pixel address belongs to a background element, a first human subject, a second human subject, etc. For example, FIG. 7 shows data structure 152 including a player index equal to zero for wall pixel 154, data structure 156 including a player index equal to zero for door pixel 158, and data structure 160 including a player index equal to one for pixel 162 of a human subject. While this example shows the player/background indices as part of the same data structure that holds the depth values, other arrangements are possible. In some embodiments, depth information, player/background indices, body part indices, body part probability distributions, and other information may be tracked in a common data structure, such as a matrix addressable by pixel address. In other embodiments, different masks may be used to track information through pose tracking pipeline 100. The player index may be a discrete index or a fuzzy index indicating a probability that a pixel belongs to a particular target (e.g., human subject) and/or the background.

A variety of different background removal techniques may be used. Some background removal techniques may use information from one or more previous frames to assist and improve the quality of background removal. For example, a depth history image can be derived from two or more frames of depth information, where the depth value for each pixel is set to the deepest depth value that pixel experiences during the sample frames. A depth history image may be used to identify moving objects in the foreground of a scene (e.g., a human subject) from the nonmoving background elements. In a given frame, the moving foreground pixels are likely to have depth values that are smaller than the corresponding depth values (at the same pixel addresses) in the depth history image. In a given frame, the nonmoving background pixels are likely to have depth values that match the corresponding depth values in the depth history image.

As one nonlimiting example, a connected island background removal may be used. Using a connected island approach, an input depth stream can be used to generate a set of samples (e.g., voxels) that can be conceptually unprojected back into world space. Foreground objects are then isolated from background objects using information from previous frames. In particular, the process can be used to determine whether one or more voxels in the grid are associated with a background by determining whether an object of the one or more objects in the grid is moving. This may be accomplished, at least in part, by determining whether a given voxel is close to or behind a reference plate that is a history of the minimum or maximum values observed for background objects. The output from this process can be used to assign each data point (e.g., pixel) a player index or a background index.

Additional or alternative background removal techniques can be used to assign each data point a player index or a background index, or otherwise distinguish foreground targets from background elements. In some embodiments, particular portions of a background may be identified. For example, at 118 of FIG. 6, a floor in a scene may be identified as part of the background. In addition to being removed from consideration when processing foreground targets, a found floor can be used as a reference surface that can be used to accurately position virtual objects in game space, stop a flood-fill that is part of generating a connected island, and/or reject an island if its center is too close to the floor plane.

A variety of different floor finding techniques may be used. In some embodiments, a depth image can be analyzed in screen space row by row. For selected candidate rows of the screen space depth image (e.g., rows near the bottom of the image), a straight depth line can be interpolated through two candidate points that are believed to be located on a floor surface. Boundary lines can then be fit to endpoints of the straight depth lines. The boundary lines can be averaged and used to define a plane that is believed to correspond to the floor surface.

In other embodiments, a floor finding technique may use three points from a depth image to define a candidate floor surface. The three points used to define the candidate can be randomly selected from a lower portion of the depth image, for example. If the normal of the candidate is substantially vertical in world space, the candidate is considered, and if the normal of the candidate is not substantially vertical, the candidate can be rejected. A candidate with a substantially vertical normal can be scored by counting how many points from the depth image are located below the candidate and/or what the average distance such points are below the candidate. If the number of points below the candidate exceeds a threshold and/or the average distance of points below the candidate exceeds a threshold, the candidate can be rejected. Different candidates are tested, and the candidate with the best score is saved. The saved candidate may be blessed as the actual floor if a predetermined number of candidates with lower scores are tested against the saved candidate.

Additional or alternative background removal techniques can be used to assign each data point a player index or a background index, or otherwise distinguish foreground targets from background elements. For example, in FIG. 6 pose tracking pipeline 100 includes bad body rejection 120. In some embodiments, objects that are initially identified as foreground objects can be rejected because they do not resemble any known target. For example, an object that is initially identified as a foreground object can be tested for basic criteria that are to be present in any objects to be tracked (e.g., head and/or torso identifiable, bone lengths within predetermined tolerances, etc.). If an object that is initially identified as being a candidate foreground object fails such testing, the object may be reclassified as a background element and/or subjected to further testing. In this way, moving objects that are not to be tracked, such as a chair pushed into the scene, can be classified as background elements because such elements do not resemble a human subject.

In some embodiments, an indication of zero, one, or more problem states (e.g., problem state 103) may be output from the background removal process 104. This indication may take the form of information derived from an observed depth image by the pose tracking pipeline. As such, background removal process 104 may output a message that a certain problem state exists instead of or in addition to pixel classification information classifying each pixel of an observed depth image as either a foreground pixel belonging to the human subject or a background pixel not belonging to the human subject. The message and/or pixel classification information output by background removal process 104 may be used by another process, such as a problem state module 920 of FIG. 9 to identify and supply an identification of zero, one, or more problem states to the pose tracking pipeline.

In some embodiments, an identification of zero, one, or more problem states (e.g., problem state 103) may be supplied to the background removal process 104. The identification of the zero, one, or more problem states may be considered by the background removal process when classifying each pixel of an observed depth image (e.g., the observed depth image from which the problem state was identified or subsequent depth images that are processed by the pose tracking pipeline) as either a foreground pixel belonging to the human subject or a background pixel not belonging to the human subject. As another example, segmentation module 912 may output classification information (e.g., probabilistic or soft classification and/or hard classification) of each depth pixel as background or belonging to a particular subject. Segmentation module 912 may also provide other suitable indicators, such as proximity relationships between foreground and background regions, relevant changes in the minimum or maximum depth plates, etc.

In some examples, an identified problem state, such as a proximate state in which a portion of a human subject resides at the same or similar depth within the scene as another object may be used by the pipeline to refine foreground/background separation in a limited region of the depth image. The limited region may correspond to the region of the depth image where the problem state is present (e.g., the region including or surrounding the portion of the human subject). Techniques deemed too computationally intensive to apply to an entire depth image may be selectively applied, such as to separate a subject's arm from an arm rest of a chair or other object within the scene. Similarly, identification of an occluded state in which an object resides in front of a portion of the human subject may be used by the pipeline to refine foreground/background separation in a limited region of the depth image corresponding to the occluded portion of the human subject. This approach is in contrast to a connected island approach (e.g., where all portions of the human subject are assumed to be connected to each other within the observed depth image). The connected island approach may cause objects within the scene to be erroneously classified as belonging to the human subject, for example, if an object occludes the human subject in a manner that creates the appearance that the human subject is divided into two or more portions within the observed depth image. After foreground pixels are distinguished from background pixels, pose tracking pipeline 100 further classifies the pixels that are considered to correspond to the foreground objects that are to be tracked. In particular, at foreground pixel assignment process 106 of FIG. 6, each foreground pixel is analyzed to determine what part of a human subject's body that foreground pixel is likely to belong.

A variety of different foreground pixel assignment techniques can be used to assess which part of a human subject's body, or a machine representation of the body, a particular pixel is likely to belong. A pixel matrix or other data structure may include, for each pixel address, a body part index, confidence value, and/or body part probability distribution indicating the part, or parts, to which a pixel is likely to belong.

For example, FIG. 7 schematically shows data structure 160 including a body part index equal to nine, which corresponds to an upper, right arm, for pixel 162 of a human subject. In the simplified version of FIG. 7, the body part index is resolved to a single candidate body part (i.e., body part nine). In practice, the body part information may be a soft labeling that is represented as a histogram over possible body parts for each pixel. In other words, a probability distribution of all likely body parts may be used in some embodiments, as described in more detail below.

As one nonlimiting example, machine-learning can be used to assign each foreground pixel a body part index and/or body part probability distribution. The machine-learning approach analyzes a foreground object using information learned from analyzing a prior-trained collection of known poses. This approach can be used to assign each foreground pixel a body part index or distribution without any prior context (i.e., knowledge of the prior frame is not needed).

In some embodiments, the machine-learning foreground pixel assignment may utilize one or more decision trees to analyze each foreground pixel of interest in an observed depth image. Such analysis can find a best-guess of the body part for that pixel and the confidence that the best-guess is correct. In some embodiments, the best-guess may include a probability distribution over two or more possible body parts, and the confidence may be represented by the relative probabilities of the different possible body parts.

At each node of the decision tree, an observed depth value comparison between two pixels is made, and, depending on the result of the comparison, a subsequent depth value comparison between two pixels is made at the child node of the decision tree. The result of such comparisons at each node determines the pixels that are to be compared at the next node. The terminal nodes of each decision tree result in a body part classification and associated confidence in the classification.

In some embodiments, subsequent decision trees may be used to iteratively refine the best-guess of the body part for each pixel and the confidence that the best-guess is correct. For example, once the pixels have been classified with the first classifier tree (based on neighboring depth values), a refining classification may be performed to classify each pixel by using a second decision tree that looks at the previous classified pixels and/or depth values. A third pass may also be used to further refine the classification of the current pixel by looking at the previous classified pixels and/or depth values. It is to be understood that virtually any number of iterations may be performed, with fewer iterations resulting in less computational expense and more iterations potentially offering more accurate classifications and/or confidences.

The decision trees may be constructed during a training mode in which a sample of known models in known poses are analyzed to determine the questions (i.e., tests) that can be asked at each node of the decision trees in order to produce accurate pixel classifications.

In some embodiments, an indication of zero, one, or more problem states (e.g., problem state 103) may be output from the foreground pixel assignment process 106. This indication may take the form of information derived from an observed depth image by the pose tracking pipeline. As such, foreground pixel assignment process 106 may output a message that a certain problem state exists instead of or in addition to pixel assignment information labeling each pixel of the observed depth image classified as a foreground pixel (e.g., a pixel belonging to the human subject) with body part information indicating a likelihood that that the foreground pixel belongs to one or more body parts of the human subject. The message and/or pixel assignment information output by pixel assignment process 106 may be used by another process, such as a problem state module 920 of FIG. 9 to identify and supply an identification of zero, one, or more problem states to the pose tracking pipeline.

In some embodiments, an identification of zero, one, or more problem states (e.g., problem state 103) may be supplied to the foreground pixel assignment process 106. The identification of zero, one, or more problem states may be considered by the foreground pixel assignment process when labeling each pixel of an observed depth image (e.g., the observed depth image from which the problem state was identified or subsequent depth images that are processed by the pose tracking pipeline) classified as a foreground pixel with body part information indicating a likelihood that that the foreground pixel belongs to one or more body parts of the human subject. In some examples, a decision tree, such as one trained with a known pose set related to a particular problem state or a set of problem states, or a decision tree dedicated to a particular body part or a set of body parts likely to have specific problem states, may be selectively applied to corresponding problematic regions of pixels to determine whether the pixel is a foreground or background pixel.

Turning back to FIG. 6, after foreground pixels are labeled with body part information, pose tracking pipeline 100 includes model fitting process 108, which finds one or more possible skeletons that serve as machine representations of the human subject.

A variety of different model fitting techniques may be used. During model fitting process 108, a human subject is modeled as a virtual skeleton including a plurality of skeletal points defined in three or more dimensions. The various skeletal points may correspond to actual joints of a human subject, terminal ends of a human subject's extremities, and/or points without a direct anatomical link to the human subject. Each skeletal point has at least three degrees of freedom (e.g., world space x, y, z). As such, the virtual skeleton can be fully defined by $3 \times \lambda$ values, where $\lambda$ is equal to the total number of skeletal points included in the skeleton. A virtual skeleton with 31 skeletal points can be defined by 93 values, for example. As described with reference to FIG. 5 above, some skeletal points may account for axial roll angles.

The various model fitting approaches compatible with pose tracking pipeline 100 may use depth information, background information, body part information, prior trained anatomical and kinetic information, and/or zero, one, or more problem states (e.g., problem state 103) to deduce one or more skeleton(s) that closely model a human subject.

As an example, the body part information that is assessed for the foreground pixels may be used to find one or more candidate locations (e.g., centroids) for one or more skeletal bones. Furthermore, a plurality of plausible virtual skeletons may be assembled to include skeletal bones at different combinations of the plurality of candidate locations. The various plausible virtual skeletons may then be scored, and the scored proposals can be combined into a final estimate.

Clumps of foreground pixels may individually include body part probability distributions indicating that a particular body part is probable for that clump. In some cases, two or more clumps that are spaced apart from one another may indicate that the same body part is probable. For example, the clumps of pixels actually showing the right and left hands of a target may both be labeled with body part information indicating a high probability for a right hand body part. As such, two or more centroid candidates may be calculated for each body part. Each centroid candidate for a particular body part may be represented in four dimensions—x, y, z and probability w that the candidate belongs to that body part. In other words, each centroid defines a location of a clump of neighboring foreground pixels individually having body part probability distributions indicating that that body part is probable for that clump of neighboring foreground pixels. Furthermore, each centroid defines a single probability representing all individual body part probability distributions within the clump.

Two or more different centroid candidates can be considered in finding a virtual skeleton that closely models a human subject. The various candidate centroids can be scored against one another (e.g., number of pixels in clump multiplied by average probability that pixels in the clump belong to a particular body part). The scores may be adjusted based on one or more constraints (e.g., apply a penalty when a distance between the highest scoring clump for a body part in a previous frame exceeds a threshold distance to the highest scoring clump for the same body part in the current frame). The scored centroids may be used to construct one or more plausible virtual skeletons, from which a single virtual skeleton can be derived.

Considering plural plausible virtual skeletons employs a probabilistic principle of least commitment to deal with uncertainty. As such, many possibilities may be considered throughout the model fitting phase of the pipeline, without necessarily requiring that hard decisions be made until such decisions can no longer be avoided.

If the data is unambiguous, the plurality of plausible virtual skeletons will be very similar to each other. If there are situations in which there are numerous possibilities for one or more parts of the virtual skeleton, the sample set will be more diverse, thus capturing the uncertainty.

The accuracy of the approximation can improve as the number of plausible virtual skeletons, n, increases. However, computational cost also increases as n increases. The model fitting phase of the pipeline can be restrained to focus on a relatively small number of samples (e.g., n<100). Another restraining technique may include pruning or selective reduction of samples based on scoring body part relationships. For example, if there is only one high confidence proposal for the neck of a human subject, then shoulder proposals which are too far from the neck may be rejected. Accordingly, the early rejection or preservation decisions on proposals may be influenced by the identification of zero, one, or more problem states. To improve results when working with fewer samples, information from foreground pixel assignment process 106 and past skeletal motion information may be used to improve the intelligence of the search for a set of proposal virtual skeletons. The plausible virtual skeletons can be evaluated against the input data (e.g., observed depth images and/or an identification of problem states supplied to the pose tracking pipeline), and other sources of information, to arrive at a final approximation.

As shown in FIG. 6, model fitting process 108 may receive input from previous phases of pose tracking pipeline 100 as well as zero, one, or more problem states (e.g., problem state 103). Model fitting process 108 may receive one or more raw depth images from depth image acquisition 102, player/background information from background removal process 104, and body part information from foreground pixel assignment process 106.

With all available inputs, foreground regions of the depth image may be segmented into a set of patches, which are regions of roughly consistent depth. This effectively approximates the full depth image by a set of small planar regions. For a modest loss of fidelity, this can reduce the bandwidth requirements from millions of pixel accesses, to thousands of patch accesses.

Plausible virtual skeletons may then be proposed from the previous foreground pixel assignments. The purpose of this phase is to convert pixel-wise body part probability distributions into proposals for full virtual skeletons (e.g., 93 values for a $\lambda=31$ skeleton). In the spirit of the principle of least commitment, all likely locations for a body part are considered until global information can be brought to bear. Therefore, this phase may include two components: a body part proposer, which extracts candidate locations from foreground pixel assignment process 106 for each body part independently (e.g., finding candidate centroids for each body part, as introduced above); and a virtual skeleton generator, which combines these candidates into complete virtual skeletons.

In some embodiments, an indication of zero, one, or more problem states (e.g., problem state 103) may be output from the model fitting process 108. This indication may take the form of information derived from an observed depth image by the pose tracking pipeline. As such, model fitting process 108 may output a message that a certain problem state exists instead of or in addition to a set of one or more proposed virtual skeletons for an observed depth image in which at least one of the set of proposed virtual skeletons indicates the problem state. The message and/or set of one or more virtual skeletons output by model fitting process 108 may be used by another process, such as a problem state module 920 of FIG. 9 to identify and supply an identification of zero, one, or more problem states to the pose tracking pipeline.

In some embodiments, an identification of zero, one, or more problem states (e.g., problem state 103) may be supplied to the model fitting process 108. The identification of zero, one, or more problem states may be considered by the model fitting process to identify a set of proposed virtual skeletons that are supplied to a model resolution process 110 for a given observed depth image (e.g., the observed depth image from which the problem state was identified or subsequent depth images that are processed by the pose tracking pipeline).

As discussed above, in at least some embodiments, model fitting can be used to find a plurality of different plausible or proposed virtual skeletons. A proposed virtual skeleton can be scored using a variety of different metrics, including an identification of zero, one, or more problem states (e.g., problem state 103) that are supplied to the model resolution process 110. In FIG. 6, pose tracking pipeline 100 includes model resolution process 110, in which a single virtual skeleton is derived from the plurality of plausible virtual skeletons. A variety of different model resolution techniques may be used. In some embodiments, two or more plausible virtual skeletons may be scored against each other based on weight, observed motion over time, anticipated bone length, foreground/background crossing, problem states, and/or other factors. A proposed virtual skeleton with a highest score may be selected; or the best scoring portions of two or more different proposed virtual skeletons, from one or more different frames, may be combined into a selected virtual skeleton. Furthermore, various constraints (e.g., bone length, joint angle, collision testing, etc.) may be applied to one or more virtual skeletons to shift the proposed skeleton(s) into a better matching pose.

In addition to or as an alternative to scoring based on problem states, scoring functions may be weighted according to the identified problem states. An example includes a scoring function that penalizes proposals in which a body part of a human subject cannot be connected to another body part without crossing through a proposed background region of the scene e.g. a wrist proposal that cannot be connected to an elbow proposal without crossing through a proposed background region). As a nonlimiting example, such a scoring function may apply a penalty scaled by a factor that is based, at least in part, on a number of proposed background pixels crossed between the proposed body parts. When a problem state such as a proximate state is identified, the resulting penalty may be dampened (e.g., reduced) responsive to expected or identified ambiguity in background/foreground pixel classification, so that the scoring function has less of an effect or influence on the result than if the subject (or part of the subject) is more distant from a background object.

In some embodiments, an indication of zero, one, or more problem states (e.g., problem state 103) may be output from the model resolution process 110. This indication may take the form of information derived from an observed depth image by the pose tracking pipeline. As such, model resolution process 110 may output a message that a certain problem state exists instead of or in addition to a selected virtual skeleton from the set of proposed virtual skeletons. The message and/or selected virtual skeleton output by model resolution process 110 may be used by another process, such as a problem state module 920 of FIG. 9 to identify and supply an identification of zero, one, or more problem states to the pose tracking pipeline.

In some embodiments, an identification of zero, one, or more problem states (e.g., problem state 103) may be supplied to the model resolution process 110. The identification of zero, one, or more problem states may be considered by the model resolution process to select a virtual skeleton from a set of proposed virtual skeletons for a given observed depth image (e.g., the observed depth image from which the problem state was identified or subsequent depth images that are processed by the pose tracking pipeline). For example, the pose tracking pipeline may select a three-dimensional position of at least one of the plurality of skeletal points in accordance with the identification of the problem state supplied to the pose-tracking pipeline at one or more of processes 104, 106, 108, and/or 110. In some examples, an identification of zero, one, or more problem states and/or information indicating the problem states may flow directly to reporting 112 or may be provided as an output through model resolution 110. The identification of problem states can be used by or be beneficial to other aspects of the tracking system in addition to or as an alternative to other outputs, such as skeletal models.

Pose tracking pipeline 100 also includes reporting 112, where the selected skeleton is reported for use by other applications. Reporting can be performed in any suitable manner. As a nonlimiting example, an application programming interface (API) may be used to report the selected skeleton. Such an (API) may be configured to communicate the joint positions, joint velocities, joint accelerations, confidences in positions, velocities, and/or accelerations, and/or other information related to the selected skeleton for one or more targets. A content receiver (e.g., a gaming application) may then use the reported information as desired.

Figure 8:
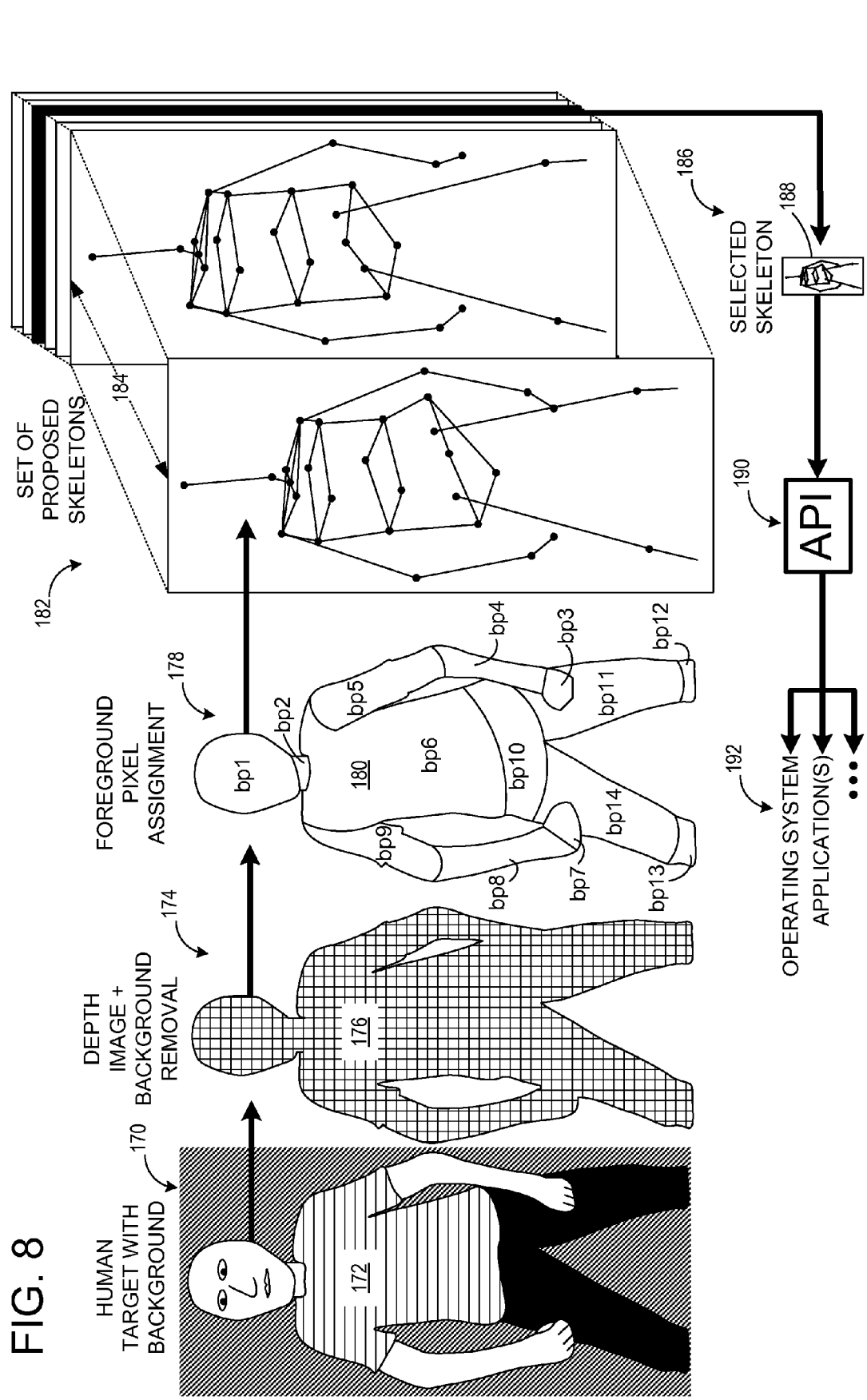
FIG. 8 schematically shows a progression of data through a pose tracking pipeline.

FIG. 8 graphically shows a progression of data through a pose tracking pipeline. On the left, a scene 170 includes a human subject 172. At 174, scene 170 is imaged by a depth camera and background information is removed from the scene. Silhouette 176 schematically represents one or more data structures capturing the depth information and player index information (e.g., as captured during depth image acquisition 102 and background removal process 104 of pose tracking pipeline 100).

At 178, the depth information believed to belong to the human subject is analyzed to determine what part of a human subject's body each pixel is likely to belong. Map 180 schematically represents one or more data structures capturing the body part information (e.g., as deduced during foreground pixel assignment process 106 of pose tracking pipeline 100).

At 182, a set of plausible virtual skeletons are proposed, where each virtual skeleton is an attempt to model the human subject as a machine representation. Virtual skeleton set 184 schematically represents one or more data structures defining the proposed virtual skeletons (e.g., as proposed during model fitting process 108 of pose tracking pipeline 100). It is to be understood that the graphical depictions of virtual skeletons in FIGS. 4, 5, and 8 is nonlimiting. Virtual skeletons with a different number and/or configuration of skeletal points and skeletal bones may be used.

At 186, a virtual skeleton is selected based on the set of plausible virtual skeletons. Virtual skeleton 188 schematically represents one or more data structures defining the selected virtual skeleton (e.g., as selected during model resolution process 110 of pose tracking pipeline 100).

At 190, the selected virtual skeleton is reported (e.g., as described with reference to reporting 112 of pose tracking pipeline 100). As indicated at 192, the reported virtual skeleton may be used as an input by an operating system, one or more applications, or any other suitable receiver.

A problem state (e.g., such as previously described problem state 103 of FIG. 6) may refer to a pre-defined state of a human subject within a scene observed by one or more optical sensors. The observed scene may be captured by the one or more optical sensors as an image. The image may take the form of a depth image or other suitable image that does not necessarily provide depth information. Zero, one, or more problem states may be identified from an individual image (e.g., a time-free image) or from a combination of two or more time-series images. An identification of zero, one, or more problem states may be supplied to the pose tracking pipeline to aid in the selection of a virtual skeleton output by the pipeline or otherwise select a three-dimensional position of one or more skeletal points in accordance with the identification of the problem state supplied to the pose-tracking pipeline.

Accuracy or reliability of pose recognition may be improved by supplying the identification of problem states to the pose tracking pipeline because the pose tracking pipeline may rely on the existence of a number of conditions or assumptions to reliably track a human subject. For example, these conditions or assumptions may include (1) that all body parts of the human subject are fully to mostly visible (e.g., non-occluded to limited occlusion), the absence of which corresponds to the occluded state, (2) all body parts are sufficiently distant from each other (e.g., low to medium proximity), the absence of which corresponds to the proximate state, (3) left-side limbs of the human subject are left of right-side limbs of the human subject, and vice-versa (e.g., no limb crossing), and an upright stance of the human subject has the feet on or near the ground, the torso upright, and no body parts are extended too far overhead (e.g., a neutral stance), the absence of which corresponds to the crossed state, (4) all body parts of the human subject are within the observed scene, the absence of which corresponds to the cropped state, and (5) the human subject is moving within an acceptable velocity range, the absence of which corresponds to the velocity limited state. As will be described in greater detail below, these problem states or the absence thereof may be identified by application of discrete classifications and/or continuous regression measurements.

The occluded state may correspond to a state of the observed depth image where at least a portion of the human subject is blocked from view within the scene by an object. The object may include another portion of the human subject (e.g., a limb or a body portion) or by another object (including other human subjects) within the environment. For example, a human subject may assume a sideways pose in which an arm and a leg may be hidden from view by the body and other leg of the human subject. Some body parts may also meaningfully self-occlude. For example, a human subject may assume a seated position in which the upper legs of the human subject are parallel to the line of sight of the optical sensor. Visible surface area estimates (e.g., in square millimeters ($mm^2$) or other suitable measurement) obtained from an observed image can provide a measure of occlusion for a body part where a value of 0.0, as a nonlimiting example, corresponds to total occlusion of the body part. A ratio of the visible surface area estimate to an expected surface area may be used to provide a useful unit-less measure of occlusion. However, surface area also depends on orientation of the body part within the observed image. Accordingly, the maximum surface area for the body party may be used to quantify self-occlusion of the body part. As an alternative to these continuous measures of occlusion, occlusion may be quantified as a discrete classification of either (1) none/minimal, (2) partial, or (3) total occlusion.

The cropped state may correspond to a state of the observed depth image where at least a portion of the human subject resides outside a boundary of the scene. Cropping may also correspond to a state of the observed depth image where the human subject exceeds a near or far plane relative to the optical sensor. Placement of the optical sensor and play space limits within which the human subject can move may result in inapplicability of the cropped state to one or more of the 6 boundaries of the scene, such as the lower boundary when the floor is fully in frustum or the far plane forming the rear boundary when the rear room wall is nearer to the optical sensor. As with occlusion, visible surface area estimates may also provide a measure of cropping where a value of 0.0, as a nonlimiting example, indicates a totally cropped body part. A discrete classification scheme having two or more cases or states may be used in addition to or as an alternative to continuous measurements. For example, a continuous measure of cropping may be quantified as a discrete classification of (1) none, (2) partial, or (3) total cropping. As another example, the cropping may be quantified as a discrete classification of (1) cropped or (2) un-cropped. Any discrete classification scheme of more than two cases or states may be expressed as a series of pairs. For example, a typical six-sided die has the discrete values 1 to 6, which may be represented as 6 cases or 6 pairs of cases (e.g. 1, not 1). Accordingly, the example discrete classifications described herein should be considered nonlimiting.

The proximate state may correspond to a state of the observed depth image where at least a portion of the human subject resides within a threshold depth proximity to an object within the scene. The object may include another part of the human subject such as a limb or body core, or may include an object within the environment. The proximity state may occur, for example, when another part of the body or the environment is not between the body part and optical sensor, but is very close to or in contact with the body part. Distance estimates (e.g., in millimeters or other suitable measurement) can provide a measure of proximity where a value of 0.0, as a nonlimiting example, indicates that the body part and the object are touching. Depth sensors have distance dependent noise floors for measurement resolution and precision. As an alternative to or in addition to a continuous measure of proximity, proximity may be quantified as a discrete classification of (1) outside, (2) near, or (3) within the noise floor of the depth sensor. As another example, the cropping may quantified as a discrete classification of (1) outside the noise floor or (2) within the noise floor. However, other suitable numbers and/or types of discrete classifications may be used. In some examples, discrete classifications may be easier to specify, apply, and or detect than continuous measurements, discrete classifications may be more computationally efficient than continuous measurements, and/or discrete classifications may be more useful than continuous measurements, or may provide additional value when used in combination with continuous measurements.

The crossed state may correspond to a state of the observed depth image where a body part of the human subject crosses a virtual boundary dividing the virtual skeleton into at least two regions from a native region to a non-native region. In some embodiments, a human subject may be assigned a number of virtual boundaries. These virtual boundaries may include, for example, a sagittal plane, a transverse plane, and a coronal plane. The anatomical planes may help describe the location of body parts in relation to each other. For a person facing the optical sensor in a relaxed stance, the sagittal plane divides the right and left sides of the human subject, the coronal plane divides the front and back of the human subject, and the transverse plane divides an upper (superior) portion of the human subject from a lower (inferior) portion of the human subject. Crossing occurs, for example, whenever a leg or an arm, or other body part crosses one of these planes. For the purpose of transverse crosses, an upper transverse plane at the shoulders of the human subject may apply to arms and a mid-transverse plane at the waist of the human subject may apply to legs. Distance estimates (e.g., in millimeters or other suitable measurement) can provide a measure of crossing where a value of 0.0, as a nonlimiting example, indicates plane intersection and a negative value, as another nonlimiting example, may indicate plane crossing by a body part.

The velocity limited state may correspond to a state of the observed depth image where the human subject has a velocity in the scene that exceeds an upper velocity threshold and/or a lower velocity threshold. Entropy increases with both absence of motion of the human subject and motion of the human subject exceeding optical sensor limits. Velocity estimates (e.g., in millimeters per millisecond or other suitable measurement) are limited by the time-series step between observed images. Other limitations of velocity may include distance dependent depth noise floors for no velocity to slow velocity of the human subject, and exposure time for very fast velocity of the human subject.

Figure 9:
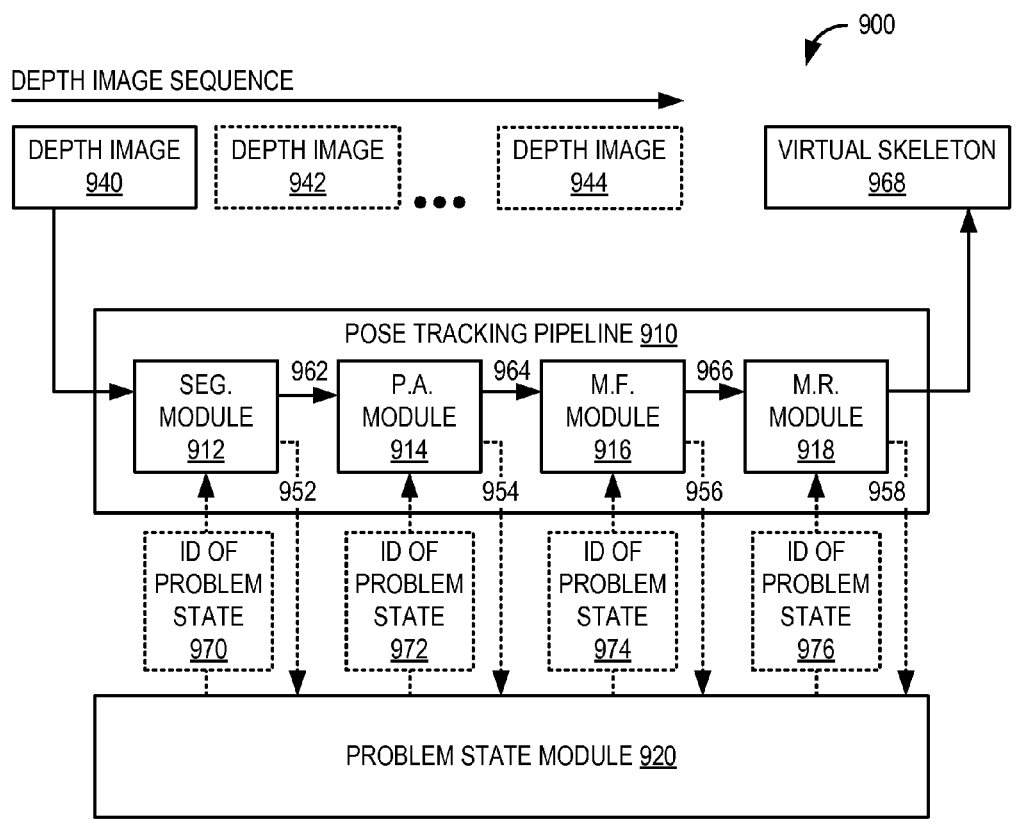
FIG. 9 schematically shows an example data flow through a pose tracking pipeline with an identification of the problem states supplied to the pose tracking pipeline.

FIG. 9 schematically shows an example data flow 900 through an example pose tracking pipeline 910. In this example, an identification of zero, one, or more problem states is supplied to the pose tracking pipeline by a problem state module 920. Pose tracking pipeline 910 may include a plurality of intermediate processes each performed by a respective module. These intermediate processes may correspond to the previously described processes of FIG. 6. For example, pose tracking pipeline 910 may include a segmentation module 912 to perform the background removal process 104, a pixel assignment module 914 to perform the foreground pixel assignment process 106, a model fitting module 916 to perform the model fitting process 108, and a model resolution module 918 to provide the model resolution process 110.

Segmentation module 912 may be configured to receive an observed depth image 940 and/or an identification of a problem state 970, and to output pixel classification information 962 classifying each pixel of the observed depth image as either a foreground pixel belonging to the human subject or a background pixel not belonging to the human subject. Segmentation module 912 may be configured to output an indication 952 of zero, one, or more problem states, which may be received by problem state module 920. Indication 952 may include a message indicating zero, one, or more problem states and/or information derived from an observed depth image by segmentation module 912 to enable problem state module 920 to identify zero, one, or more problem states. For example indication 952 may include pixel classification information that indicates the problem state output from the segmentation module.

In some examples, problem state module 920 may receive an indication of problem states and/or derived information from pose tracking pipeline 910, and may make a problem state determination based on the accumulated evidence. The identification of the problem states fed back into the pose tracking pipeline may take the form of one or more consensus problem states. For example, each module of pose tracking pipeline 910 may contribute derived information and/or problem state indicators, hints, or opinions to problem state module 920. Problem state module 920 may be configured to determine a consensus, which each module of the pose tracking pipeline 910 may then rely upon in addition to or in place of the module's own determination. Similar to proposal scoring, a variety of consensus methods may be used, including union and voting schemes such as majority and weighted. For example, a proximity determination may have a greater influence on the consensus if the proximity determination is received from segmentation module 912 than from model fitting module 916. It will be appreciated that any suitable weighting among the modules of pose tracking pipeline 910 may be used to influence the consensus determined by problem state module 920.

Pixel assignment module 914 may be configured to receive pixel classification information 962 from segmentation module 912 and/or an identification of a problem state 972 from problem state module 920, and to output pixel assignment information 964 labeling each pixel of the observed depth image classified as a foreground pixel belonging to the human subject with body part information indicating a likelihood that that the foreground pixel belongs to one or more body parts of the human subject. Pixel assignment module 914 may be configured to output an indication 954 of zero, one, or more problem states, which may be received by problem state module 920. Indication 954 may include a message indicating zero, one, or more problem states and/or information derived from an observed depth image by pixel assignment module 914 and/or segmentation module 912 to enable problem state module 920 to identify the zero, one, or more problem states. For example, indication 954 may include pixel assignment information that indicates the problem state output from the segmentation module labeling foreground pixels belonging to the human subject with body part information.

Model fitting module 916 may be configured to receive pixel assignment information 964 from pixel assignment module 914 and/or an identification of a problem state 974 from problem state module 920, and to output a set of proposed virtual skeletons 966 for the human subject. Model fitting module 916 may be configured to output an indication 956 of zero, one, or more problem states, which may be received by problem state module 920. Indication 956 may include a message indicating zero, one, or more problem states and/or information derived from an observed depth image by model fitting module 916, pixel assignment module 914 and/or segmentation module 912 to enable problem state module 920 to identify the zero, one, or more problem states.

For example, indication 956 may include at least one virtual skeleton of a set of proposed virtual skeletons.

Model resolution module 918 may be configured to receive a set of proposed virtual skeletons 966 from model fitting module 916 and/or an identification of a problem state 976 from problem state module 920, and to output selected virtual skeleton 968 from the set of proposed virtual skeletons. Model resolution module 918 may be configured to output an indication 958 of zero, one, or more problem states, which may be received by problem state module 920. Indication 958 may include a message indicating zero, one, or more problem states and/or information derived from an observed depth image by model resolution module 918, model fitting module 916, pixel assignment module 914 and/or segmentation module 912 to enable problem state module 920 to identify the zero, one, or more problem states. For example, indication 958 may include the selected virtual skeleton or a portion thereof (e.g., a body part).

As depicted in FIG. 9, problem state module 920 may supply an identification of a problem state to one or more intermediate processes of pose tracking pipeline 910. In some embodiments, problem state module 920 may supply an identification of the same problem state to some or all of these intermediate processes. For example, identified problem states at 970, 972, 974, and 976 in FIG. 9 may correspond to the same problem state or set of problem states indicated to each module of pose tracking pipeline 910.

In some embodiments, problem state module 920 may supply an identification of different problem states to some or all of the intermediate processes of the pose tracking pipeline. For example, identified problem states at 970, 972, 974, and 976 in FIG. 9 may correspond to different problem states or sets of problem states identified to respective modules of pose tracking pipeline 910.

FIG. 9 further depicts an example where observed depth image 940 is one of a plurality of observed depth images of a depth image sequence. For example, observed depth image 940 may be followed in time (e.g., as time-series) by observed depth image 942, which in turn may be followed in time by observed depth image 944. This depth image sequence may take the form of captured video, for example. A problem state identified with respect to a previous frame (e.g., observed depth image 940) may be supplied to the pose tracking pipeline when processing a subsequent frame (e.g., observed depth image 942 and/or an observed depth image 944).

In some embodiments, an indication of zero, one, or more problem states output by pose tracking pipeline 910 (e.g., at 952, 954, 956, 958) may be used by problem state module 920 to identify the problem states, to identify intermediate processes that are to be supplied an identification of the problem states, and to supply the identification of the problem states to the identified processes. In some embodiments, some or all of the intermediate processes of pose tracking pipeline 910 may be configured to directly identify the problem states, which may be output to problem state module 920.

Figure 10:
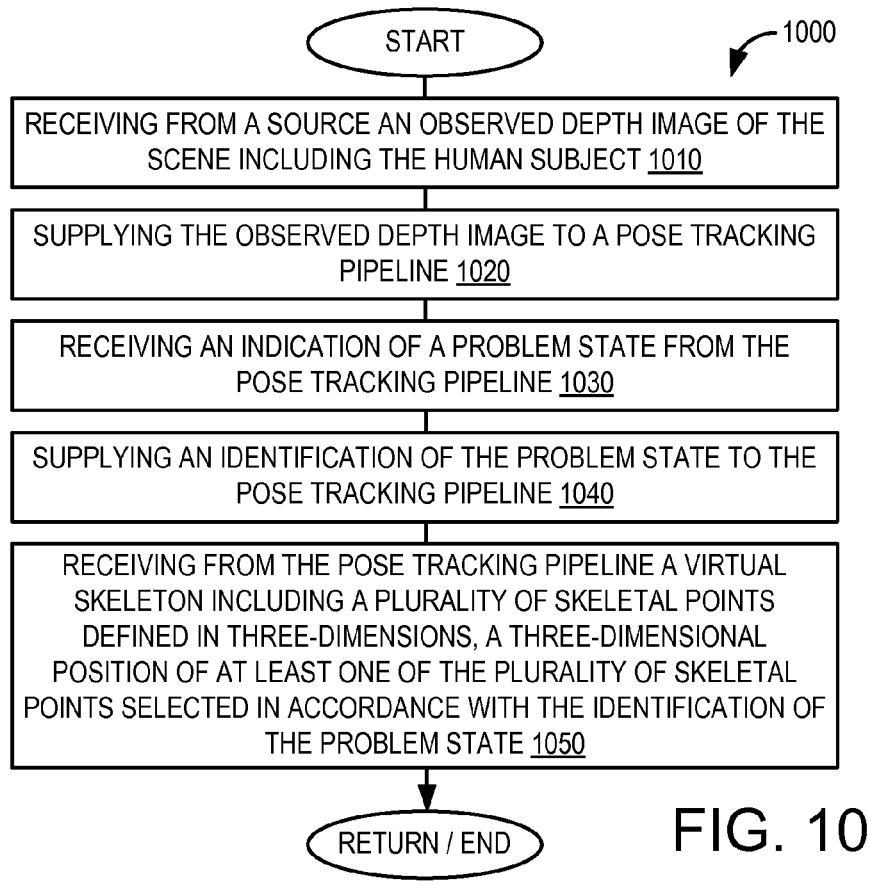
FIG. 10 is a flow diagram depicting an example method for tracking a human subject.

FIG. 10 is a flow diagram depicting an example method 1000 for tracking a human subject within a scene. As one example, method 1000 may be performed by previously described problem state module 920 of FIG. 9.

At 1010, the method includes receiving from a source, an observed depth image of the scene including the human subject. At 1020, the method includes supplying the observed depth image to a pose tracking pipeline. At 1030, the method includes receiving an indication of a problem state from the pose tracking pipeline. The problem state indicated by the pose tracking pipeline may be one of a plurality of problem states indicated by the pose tracking pipeline, and may be received from one or more intermediate processes of the pipeline. As previously described, these intermediate processes may correspond to respective modules of the pose tracking pipeline. In some examples, zero (i.e., no or none) problem states may be indicated by the pose tracking pipeline.

In some embodiments, an indication of the problem state from the pose tracking pipeline may include an identification of the problem state itself (e.g., as a problem state identifier). In this embodiment, a process or module of the pose tracking pipeline may directly identify the problem state.

In some embodiments, an indication of the problem state may be received from the pose tracking pipeline as information derived from the observed depth image by the pose tracking pipeline. The problem state may be identified from a set of available problem states based on the information derived from the observed depth image. In this embodiment, the problem state may be identified, for example, by a problem state module as described in greater detail with reference to FIG. 11.

At 1040, the method includes supplying an identification of one or more problem states to the pose tracking pipeline. If a plurality of problem states are indicated by the pose tracking pipeline, then an identification of zero (i.e., no or none), some, or all of the plurality of problem states may be supplied to the pose tracking pipeline. As previously discussed, body part segmentation and prediction from time-series depth images may be estimated probabilistically (e.g., soft classification) and/or as a hard classification where a state is either applicable or not (e.g., 0 or 1). Soft or hard classifications may be applied to problem states on a per body part basis. For example, a probability value or hard classification may be supplied to the pose tracking pipeline for some or all of the identified problem states. With reliable classification or regression, these problem states can influence each model fitting stage, such as with state specific synthesis, state weighted scoring, state driven dynamic selection and/or ordering of regressors, and state based constraints. In some embodiments, an identification of a problem state may be supplied to the pose tracking pipeline for each body part of a human subject modeled with a plurality of body parts.

At 1050, the method includes receiving from the pose tracking pipeline a virtual skeleton including a plurality of skeletal points defined in three or more dimensions. In some examples, the plurality of skeletal points may be defined spatially in three-dimensions. Examples of other dimensions include a confidence or probability in a position of a skeletal point, a velocity and/or acceleration vector for some or all of the skeletal points, a joint rotation vector for some or all of the joints, a shape (e.g., volumetric metrics on a shape type such as a sphere, cylinder, or other suitable shape with which the skeletal point is associated), an indication of whether a joint is tracked, not tracked, or inferred, or other suitable indication of state. Accordingly, the pipeline may output an indication of these other dimensions or different dimensions in addition to or as an alternative to the three spatial dimensions for some or all of the skeletal points. For example, the pose tracking pipeline may be configured to output a plurality of skeletal points ordered from most to least likely or to output the top "n" candidate skeletal points from the most to least likely to provide an indication of a confidence or probability or some other weighted indicator of state.

As one example, the pose tracking pipeline may select a three-dimensional position and/or other suitable dimensions discussed above of at least one, some, or all of the plurality of skeletal points in accordance with the identification of zero, one, or more of the problem states supplied to the pose tracking pipeline. Additionally or alternatively, the pose tracking pipeline may select one, some, or all of the plurality of skeletal points not in accordance with the identification of one or more of the problem states supplied to the pose-tracking pipeline. For example, the pose tracking pipeline may disregard or override one or more of the identified problem states, at least under some conditions. As another example, identification of zero (i.e., no or none) problem states may be indicated to the pose tracking pipeline or an identification of any problem states may be withheld. The pose tracking pipeline may select one or more of the plurality of skeletal points in accordance with the indication of zero problem states or the lack of indication of any problem states.

The virtual skeleton received at 1050 includes the virtual skeleton selected for an observed depth image supplied to the pose tracking pipeline. In some embodiments, the pose tracking pipeline is configured to apply the identification of the problem state supplied to the pose tracking pipeline to the observed depth image, and the virtual skeleton that is received from the pose tracking pipeline corresponds to the observed depth image. In some embodiments, a subsequently observed depth image may be supplied to the pose tracking pipeline, and the pose tracking pipeline may be configured to apply the identification of the problem state supplied to the pose tracking pipeline to the subsequently observed depth image. In this embodiment, the virtual skeleton received from the pose tracking pipeline corresponds to the subsequently observed depth image rather than a previously observed image from which the problem state was identified. As previously discussed, individual modules of the pose tracking pipeline may utilize problem states identified by the problem state module in place of or in addition to problem states or other information identified by the modules.

Figure 11:
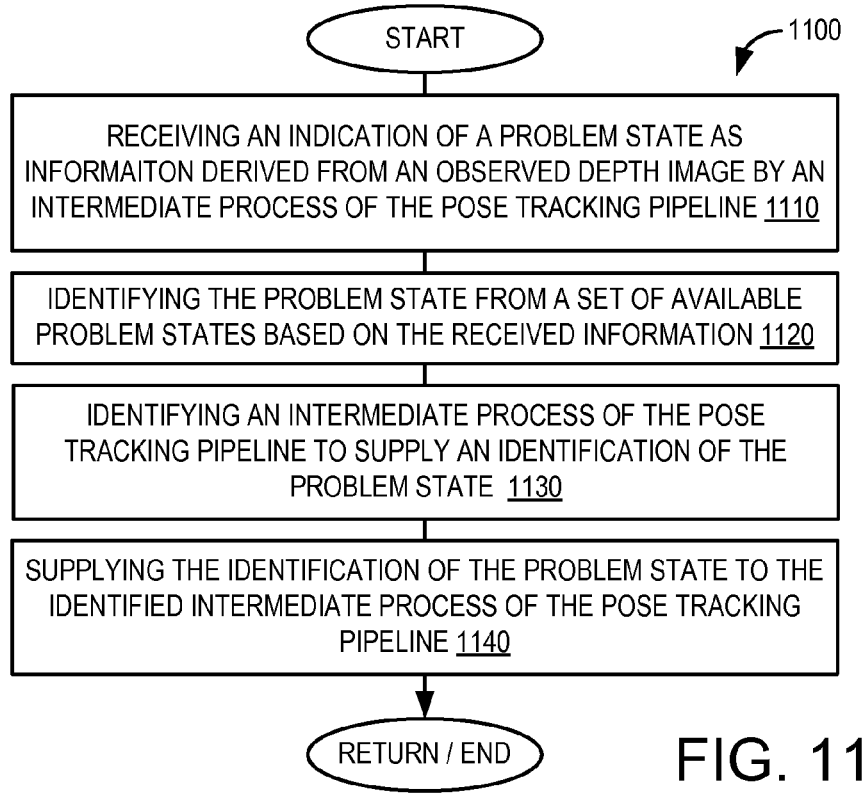
FIG. 11 is another flow diagram depicting an example method for tracking a human subject.

FIG. 11 is another flow diagram depicting an example method 1100 for tracking a human subject. As one example, method 1100 may be performed by previously described problem state module 920 of FIG. 9. Method 1100 may correspond to an example implementation of previously described method 1000 of FIG. 10.

At 1110, the method includes receiving an indication of a problem state as information derived from an observed depth image by an intermediate process of the pose tracking pipeline. At 1120, the method includes identifying the problem state from a set of available problem states based on the received information. In some embodiments, filtering of problem states indicated by the pose tracking pipeline may be performed to reduce a number of problem states identified to the pipeline. For example, if a plurality of problem states are indicated by the pose tracking pipeline then filtering may be performed to eliminate the least likely or least prominent problem states. Problem states that remain after the filtering may be identified to the pose tracking pipeline.

Problem states may be described as one of multiple discrete states (e.g., a domain of classification in machine learning) and/or as a measure of one of the multiple discrete states (e.g., a domain of regression in machine learning). Problem states may be identified by application of one or more classifiers and/or one or more regressors to individual images or combination of images observed by an optical sensor.

In some embodiments, a problem state may be identified from a set of available problem states by applying classifier analysis to the set of available problem states. The classifier analysis may be used to classify each problem state of the set of available problem states as either an applicable problem state or an inapplicable problem state based on the information derived from the observed depth image. The identification of the problem state supplied to the pose tracking pipeline may be classified as an applicable problem state, whereas other problem states not identified to the pose tracking pipeline may be instead classified as an inapplicable problem state.

In some embodiments, a problem state may be identified from a set of available problem states by applying regressor analysis to the set of available problem states. The regressor analysis may be used to assign one or more of a measurement (e.g., of an estimated area in square millimeters, a distance in millimeters, etc.), a probability that the problem state exists in the image, and/or a relative weighting to each problem state of the set.

At 1130, the method includes identifying an intermediate process of the pose tracking pipeline to supply an identification of the problem state. In some embodiments, the intermediate processes identified at 1130 may be based on an operating parameter. The operating parameter may include, for example, the problem state itself, as indicated by the pose tracking pipeline and/or the intermediate process of the pose tracking pipeline from which an indication of the problem state was received. For example, the type of problem state may determine to which intermediate process an identification of the problem state is to be supplied. As another example, problem states that are indicated by a particular intermediate process of the pose tracking pipeline may be predetermined to be supplied to a particular intermediate process of the pipeline as one or more identified problem states.

At 1140, the method includes supplying an identification of the problem state identified at 1120 to the intermediate process of the pose tracking pipeline identified at 1130. The pose tracking pipeline then uses the identification of the problem states supplied at 1140 to select and output a virtual skeleton for an observed depth image. In some embodiments, a problem state may be identified to the pipeline for each body part of a plurality of body parts used to model the human subject.

An example implementation for an occluded state follows: The occluded state is identified per body part of a human subject. The occluded state may be characterized as either (1) unknown, if the occluded state is unknown, (2) none, if the body part is not occluded, (3) local, if the body part is locally occluded by itself or by a neighboring body part, (4) core, if the body part is occluded by the body core, (5) cross, if the body party is occluded by a different limb, (6) environ, if the body part is occluded by an object in the environment.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A method of tracking a human subject within a scene, the method comprising:
   receiving from a source an observed depth image of the scene including the human subject;
   supplying the observed depth image to a pose tracking pipeline;

receiving an indication of a problem state from the pose tracking pipeline;

supplying an identification of the problem state to the pose tracking pipeline; and receiving from the pose tracking pipeline a virtual skeleton including a plurality of skeletal points defined in three-dimensions, the pose tracking pipeline selecting a three-dimensional position of at least one of the plurality of skeletal points in accordance with the identification of the problem state supplied to the pose-tracking pipeline.

2. The method of claim 1, wherein the indication of the problem state is received from the pose tracking pipeline as information derived from the observed depth image by the pose tracking pipeline; and wherein the method further comprises identifying the problem state from a set of available problem states based on the information derived from the observed depth image.

3. The method of claim 2, wherein identifying the problem state from the set of available problem states includes applying classifier analysis to the set of available problem states to classify each problem state of the set as either an applicable problem state or an inapplicable problem state based on the information derived from the observed depth image.

4. The method of claim 2, wherein identifying the problem state from the set of available problem states includes applying regressor analysis to the set of available problem states to assign a measurement and/or probability to each problem state of the set.

5. The method of claim 1, wherein receiving the indication of the problem state from the pose tracking pipeline includes receiving the identification of the problem state from an intermediate process of the pose tracking pipeline; and wherein supplying the identification of the problem state to the pose tracking pipeline includes supplying the identification of the problem state to another intermediate process of the pose tracking pipeline.

6. The method of claim 1, wherein the pose tracking pipeline includes a segmentation module to receive the observed depth image supplied to the pose tracking pipeline, and to output pixel classification information classifying each pixel of the observed depth image as either a foreground pixel belonging to the human subject or a background pixel not belonging to the human subject; and wherein receiving the indication of the problem state from the pose tracking pipeline includes receiving one or more of a message indicating the problem state and/or the pixel classification information indicating the problem state.

7. The method of claim 1, wherein the pose tracking pipeline includes a pixel assignment module to output pixel assignment information labeling each pixel of the observed depth image classified as a foreground pixel belonging to the human subject with body part information indicating a likelihood that that the foreground pixel belongs to one or more body parts of the human subject; and wherein receiving the indication of the problem state from the pose tracking pipeline includes receiving one or more of a message indicating the problem state and/or the pixel assignment information indicating the problem state.

8. The method of claim 1, wherein the pose tracking pipeline includes a model fitting module to output a set of proposed virtual skeletons for the human subject; and wherein receiving the indication of the problem state from the pose tracking pipeline includes receiving one or more of a message indicating the problem state and/or the set of proposed virtual skeletons indicating the problem state.

9. The method of claim 1, wherein the pose tracking pipeline includes a model resolution module to receive a set of proposed virtual skeletons, and output the virtual skeleton from the skeleton tracking pipeline as a selected virtual skeleton;

wherein receiving the indication of the problem state from the pose tracking pipeline includes receiving one or more of a message indicating the problem state and/or the selected virtual skeleton indicating the problem state.

10. The method of claim 1, wherein the problem state indicated by the pose tracking pipeline is one of a plurality of problem states indicated by the pose tracking pipeline; and wherein the method further includes supplying an identification of the plurality of problem states to the pose tracking pipeline.

11. The method of claim 1, further comprising:

identifying an intermediate process of the pose tracking pipeline to supply the identification of the problem state based on an operating parameter, the operating parameter including one or more of:

the problem state indicated by the pose tracking pipeline; and/or an intermediate process of the pose tracking pipeline from which the indication of the problem state was received.

12. The method of claim 1, wherein the indication of the problem state received from the pose tracking pipeline corresponds to a problem state of the observed depth supplied to the pose tracking pipeline; and wherein the virtual skeleton received from the pose tracking pipeline corresponds to the observed depth image supplied to the pose tracking pipeline.

13. The method of claim 1, further comprising:

supplying a subsequently observed depth image of the scene including the human subject to the pose tracking pipeline;

wherein the indication of the problem state received from the pose tracking pipeline corresponds to a problem state of the observed depth supplied to the pose tracking pipeline; and wherein the virtual skeleton received from the pose tracking pipeline corresponds to the subsequently observed depth image supplied to the pose tracking pipeline.

14. The method of claim 1, wherein the problem state includes an occluded state corresponding to a state of the observed depth image where at least a portion of the human subject is blocked from view within the scene by an object.

15. The method of claim 1, wherein the problem state includes a cropped state corresponding to a state of the observed depth image where at least a portion of the human subject resides outside a boundary of the scene.

16. The method of claim 1, wherein the problem state includes a proximate state corresponding to a state of the observed depth image where at least a portion of the human subject resides within a threshold depth proximity to an object within the scene.

17. The method of claim 1, wherein the problem state includes a crossed state corresponding to a state of the observed depth image where a body part of the human subject crosses a virtual boundary dividing the virtual skeleton into at least two regions from a native region of the body part to a non-native region of the body part.

18. The method of claim 1, wherein the problem state includes a velocity limited state corresponding to a state of the observed depth image where the human subject has a velocity in the scene that exceeds an upper velocity threshold and/or a lower velocity threshold.

19. A computing device, comprising:
   a logic subsystem; and
   a data-holding subsystem holding instructions executable by the logic subsystem of the computing device to:
      receive from a source an observed depth image of a scene including a human subject;
      supply the observed depth image to a pose tracking pipeline;
      receive an indication of a problem state from the pose tracking pipeline;
      supply an identification of the problem state to the pose tracking pipeline; and
      receive from the pose tracking pipeline a virtual skeleton including a plurality of skeletal points defined in three-dimensions, the pose tracking pipeline selecting a three-dimensional position of at least one of the plurality of skeletal points in accordance with the identification of the problem state supplied to the pose-tracking pipeline.

20. A computing device, comprising:
   a logic subsystem; and
   a data-holding subsystem holding instructions executable by the logic subsystem of the computing device, the instructions including:
      a pose tracking pipeline configured to output a virtual skeleton for an observed depth image of a human subject and an identification of a problem state supplied to the pose tracking pipeline for each body part of a plurality of body parts of the human subject;
      a problem state module configured to:
         receive information derived from the observed depth image from an intermediate process of the pose tracking pipeline;
         identify the problem state from a set of available problem states for each body part of the plurality of body parts based on the information received from the intermediate process; and
         supply an identification of the problem state for each body part identified by the problem state module to another intermediate process of the pose tracking pipeline, the pose tracking pipeline selecting a three-dimensional position of at least one of the plurality of skeletal points in accordance with the identification of the problem state supplied to the pose-tracking pipeline for at least one body part.

* * * * *